(12) United States Patent
Hu et al.

(10) Patent No.: US 12,505,563 B2
(45) Date of Patent: Dec. 23, 2025

(54) METHOD AND APPARATUS FOR PREDICTING VEHICLE TRAJECTORY, AND METHOD AND APPARATUS FOR TRAINING NEURAL NETWORK PREDICTION MODEL

(71) Applicant: Horizon Robotics Inc., Cupertino, CA (US)

(72) Inventors: Yihan Hu, Cupertino, CA (US); Kun Li, Cupertino, CA (US); Pingyuan Liang, Cupertino, CA (US)

(73) Assignee: Horizon Robotics Inc.

( * ) Notice: Subject to any disclaimer, the term of this patent is extended or adjusted under 35 U.S.C. 154(b) by 291 days.

(21) Appl. No.: 18/449,002

(22) Filed: Aug. 14, 2023

(65) Prior Publication Data

US 2024/0420344 A1    Dec. 19, 2024

Related U.S. Application Data

(60) Provisional application No. 63/508,355, filed on Jun. 15, 2023.

(51) Int. Cl.
*G06T 7/246* (2017.01)
*B60W 50/00* (2006.01)
(Continued)

(52) U.S. Cl.
CPC ............... *G06T 7/248* (2017.01); *G06T 7/74* (2017.01); *B60W 50/0097* (2013.01); *B60W 60/0015* (2020.02); *B60W 2420/403* (2013.01); *G06T 2207/20084* (2013.01); *G06T 2207/30241* (2013.01); *G06T 2207/30252* (2013.01)

(58) Field of Classification Search
CPC . G06T 7/248; G06T 7/74; G06T 2207/20084; G06T 2207/30241; G06T 2207/30252; B60W 60/0015; B60W 50/0097; B60W 2420/403
See application file for complete search history.

(56) References Cited

U.S. PATENT DOCUMENTS

| 2019/0261016 A1* | 8/2019 | Liu .......................... G06N 3/08 |
| 2023/0186640 A1* | 6/2023 | Kocamaz ............... G06V 10/46 |
| | | 382/104 |

FOREIGN PATENT DOCUMENTS

| CN | 110619658 A * | 12/2019 | ............. G06T 7/246 |
| EP | 4131175 A1 * | 2/2023 | ........... G06N 3/0464 |

OTHER PUBLICATIONS

Extended European Search Report from corresponding European Patent Application No. 24181378.1, mailed on Nov. 15, 2024.
(Continued)

*Primary Examiner* — Pinalben Patel
(74) *Attorney, Agent, or Firm* — K&L Gates LLP

(57) ABSTRACT

Disclosed are a method and an apparatus for predicting vehicle trajectory, and a method and an apparatus for training a neural network prediction model, relating to the field of intelligent driving technology. The method for predicting vehicle trajectory including: determining raster image data of a vehicle at a current time point based on ego-vehicle travelling data of the vehicle during travelling and environmental data of the vehicle; processing the raster image data based on a neural network prediction model, and predicting a trajectory of the vehicle in a future predetermined time period based on the multidimensional feature map, ego-vehicle size data and the environmental data.

17 Claims, 8 Drawing Sheets

(51) Int. Cl.
    *B60W 60/00*     (2020.01)
    *G06T 7/73*     (2017.01)

(56) References Cited

OTHER PUBLICATIONS

Hu et al. Planning-oriented Autonomous Driving, Mar. 23, 2023.
Schafer et al., "Context-Aware Scene Prediction Network (CASPNet)", 2022 IEEE 25th International Conference on Intelligent Transportation Systems (ITSC), Oct. 8, 2022, pp. 3970-3977.

* cited by examiner

METHOD AND APPARATUS FOR PREDICTING VEHICLE TRAJECTORY, AND METHOD AND APPARATUS FOR TRAINING NEURAL NETWORK PREDICTION MODEL

CROSS-REFERENCE TO RELATED APPLICATIONS

The present application claims the benefit of U.S. provisional Application No. 63/508,355, filed on Jun. 15, 2023, the entire contents of which are incorporated herein by reference.

FIELD OF THE INVENTION

The present disclosure relates to a field of intelligent driving technology, in particular to a method and an apparatus for predicting vehicle trajectory, and a method and an apparatus for training a neural network prediction model.

BACKGROUND OF THE INVENTION

With the rapid development of society and economy, intelligent driving technology has been widely used. In intelligent driving scenarios (e.g., autonomous driving scenarios or assisted driving scenarios), intelligent driving technology is particularly important for safe vehicle driving. In general, the environmental information around the vehicle may be acquired by the sensors in the vehicle, and the trajectory of the vehicle may be predicted and planned based on the environmental information around the vehicle as well as travelling information of the vehicle. However, intelligent driving scenarios are usually highly complex, and there are many uncertain and variable factors therein, so it has become a technical problem to be solved urgently how to plan trajectories for vehicles in complex and diverse driving scenarios to ensure the safety of autonomous driving.

SUMMARY OF THE INVENTION

At present, trajectory prediction methods are unable to ensure the safety of autonomous driving in complex and diverse driving scenarios.

In order to solve the above technical problems, the present disclosure provides a method and an apparatus for predicting vehicle trajectory, and a method and an apparatus for training a neural network prediction model, by comprehensively considering the multimodality and uncertainty of the environment during the prediction of trajectories, the predicted trajectories are able to ensure the safety of autonomous driving in complex and diverse driving scenarios.

According to a first aspect of the present disclosure, there is provided a method for predicting vehicle trajectory including: determining raster image data of a vehicle at a current time point based on ego-vehicle travelling data of the vehicle during travelling and environmental data of the vehicle; processing the raster image data based on a neural network prediction model, and predicting a trajectory of the vehicle in a future predetermined time period based on the multidimensional feature map, ego-vehicle size data and the environmental data.

Based on the present scheme, since the raster image data may offer a more comprehensive spatial-temporal environment in which the vehicle is located, the multidimensional feature map that takes into account the multimodality and uncertainty of the environment may be obtained by processing the raster image data through a neural network prediction model. When the vehicle trajectory is predicted in consideration with the multidimensional feature map, vehicle size data and environmental data, the multimodality and uncertainty of the environment are fully taken into account, so that the predicted trajectory is able to ensure the safety of autonomous driving in complex and diverse driving scenarios.

According to a second aspect of the present disclosure, there is provided a method for training a neural network prediction model including: determining a plurality of sets of sample raster image data and a multidimensional sample feature map corresponding to the sample raster image data, the multidimensional sample feature map including a sample trajectory vector, a sample multimodal heatmap, and a sample occupancy grid maps processing the sample raster image data based on an initial neural network prediction model to obtain a predicted multidimensional feature map including a predicted ego-vehicle multimodal heatmap, a predicted occupancy grid map corresponding to the target object, and a predicted trajectory vector; and performing iterative training on the initial neural network prediction model to obtain a trained neural network prediction model by using the predicted multidimensional feature map as an initial training output of the initial neural network prediction model and using the multidimensional sample feature map as supervisory information.

According to a third aspect of the present disclosure, there is provided an apparatus for predicting vehicle trajectory, including: a determination module for determining raster image data of a vehicle at a current time point based on ego-vehicle size data of a vehicle during travelling and environmental data of the vehicle; a processing module for processing the raster image data determined by the determination module based on a neural network prediction model to obtain a multidimensional feature map; and an optimization module for predicting a trajectory of the vehicle in a future predetermined time period based on ego-vehicle size data, the environmental data and the multidimensional feature map determined by the processing module.

According to a fourth aspect of the present disclosure, there is provided an apparatus for training a neural network prediction model, including: a determination module for determining a plurality of sets of sample raster image data and a multidimensional sample feature map corresponding to the sample raster image data, the multidimensional sample feature map including a sample trajectory prediction map, a sample multimodal heatmap, and a sample occupancy grid map; a prediction module for processing the sample raster image data determined by the determination module based on an initial neural network prediction model to obtain a predicted multidimensional feature map including a predicted ego-vehicle multimodal heatmap, a predicted occupancy grid map corresponding to a target object, and a predicted trajectory vector; and a training module for performing iterative training on the initial neural network prediction model to obtain a trained neural network prediction model by using the predicted multidimensional feature map as an initial training output of the initial neural network prediction model and using the multidimensional sample feature map as supervisory information.

According to a fifth aspect of the present disclosure, there is provided a computer program product on which computer program instructions are stored that, when executed by a processor, cause the processor to implement the method for predicting vehicle trajectory proposed according to the first aspect of the present disclosure or the method for training a neural network prediction model proposed according to the second aspect.

According to a sixth aspect of the present disclosure, there is provided a computer-readable storage medium, on which a computer program is stored, the computer program being configured to implement any of the above-described methods.

According to a seventh aspect of the present disclosure, there is provided an electronic device, including: a processor; a memory for storing executable instructions for the processor, wherein the processor is configured to read the executable instructions from the memory and execute the instructions to any of the above-described methods.

DETAILED DESCRIPTION OF THE EMBODIMENTS

For the purpose of explaining the present disclosure, exemplary embodiments of the present disclosure will be described in detail below with reference to the accompanying drawings. Obviously, the described embodiments are only some, not all, of the embodiments of the present disclosure, and it should be understood that the present disclosure is not limited to the exemplary embodiments.

It should be noted that the relative arrangements, numerical expressions, and values with regard to the components and steps set forth in these embodiments do not limit the scope of the present disclosure, unless otherwise specified.
Application Overview In intelligent driving scenarios, the related technologies plan the vehicle trajectory by three phases: perception, prediction and planning. Among them, in the perception phase, static information (e.g., roadblocks, green belts, etc.) and dynamic information (e.g., vehicles, pedestrians, etc.) need to be abstracted from data acquired by vehicle sensors (e.g., point cloud, image data). In the prediction phase, prediction of the trajectory for the dynamic information need to be performed. In the planning phase, collection and decision of the predicted and sensed information needs to be performed to deduce an optimal vehicle trajectory.

In autonomous driving scenarios, the accuracy of trajectory planning is particularly important for the safety of vehicle driving. Typically, neural networks may be configured to learn expert trajectories to plan vehicle driving paths, and user-defined rules may also be used for path planning. However, autonomous driving scenarios are typically more complex, and there are many uncertain and variable factors therein, and the trajectory planning algorithms in the related technologies cannot ensure the safety of autonomous driving in complex and diverse driving scenarios.

Figure 1:
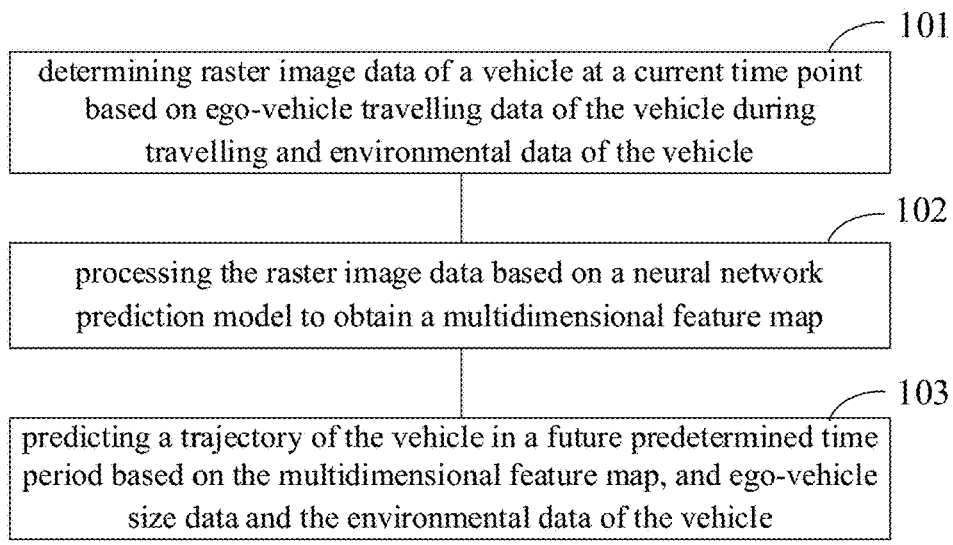
FIG. 1 is a flowchart illustrating a method for predicting vehicle trajectory according to an exemplary embodiment of the present disclosure.

In order to solve the above problem, embodiments of the present disclosure provide a method for predicting vehicle trajectory, in which raster image data is processed by a neural network prediction model to obtain a feature map of multiple dimensions for representing an environment multimodality, occupancy of the target object, the initial predicted trajectory, and the like, and based on the feature map of multiple dimensions, the optimal trajectory of a vehicle in a future predetermined time period may be accurately predicted, so as to ensure the safety of autonomous driving in complex and diverse driving scenarios.
Exemplary Method FIG. 1 is a flowchart illustrating a method for predicting vehicle trajectory according to an exemplary embodiment of the present disclosure. A flow of the method of the present embodiment may be applied to a vehicle, and in order to distinguish the vehicle from other vehicles, the term "ego-vehicle" is used in the present embodiment of the disclosure for description. As shown in FIG. 1, the method may include the following steps:

Step 101, determining raster image data of a vehicle at a current time point based on ego-vehicle travelling data of the vehicle during travelling and environmental data of the vehicle.

Exemplarily, the terms "vehicle" and "other vehicle" in embodiments of the present disclosure are used for denoting different vehicles, and "vehicle" denotes an ego vehicle, such as a vehicle in an autonomous driving state, and the flow of the method of embodiments of the present disclosure is applied to an ego vehicle for predicting an optimal trajectory of the ego vehicle. For predicting the trajectory of the ego vehicle, it is necessary to refer to the positions of other vehicles around the ego vehicle to avoid collision between the ego vehicle and the other vehicles, so the "other vehicles" used in the embodiments of the present disclosure may be vehicles around the ego vehicle.

In some embodiments, the ego-vehicle travelling data of the vehicle during travelling includes, but is not limited to, a current position of the ego vehicle, a current state of the ego vehicle, size data of the ego vehicle, navigational data of the ego vehicle, a travelling speed of the ego vehicle, a heading angle of the ego vehicle, and other data related to the travelling of the ego vehicle. The environmental data of the vehicle includes, but is not limited to, static data and dynamic data in the environment in which the ego vehicle is located. For example, static data in the environment in which the ego vehicle is located includes data of static objects such as a map centered around ego-vehicle, a lane line, a centerline, an intersection, a roadblock, a warning sign, an ice-cream cone, a traffic cone, a green belt, and the like. Dynamic data in the environment in which the ego vehicle is located includes data of dynamic objects or users around the ego vehicle such as pedestrians, cyclists, other vehicles, and the like.

Exemplarily, the ego-vehicle travelling data and the environmental data may be acquired by sensors or acquisition means in the vehicle, or may be obtained by processing the data acquired by the sensors or acquisition means.

Exemplarily, it is taken as an example that the ego-vehicle travelling data includes the current position of the ego vehicle, the travelling speed of the ego vehicle and the navigation data of the ego vehicle, and the environmental data includes historical position information (e.g., position information in the last 2 s) of a target object (e.g., the target object includes dynamic objects around the ego vehicle, such as, other vehicles, pedestrians, cyclists, etc.) and map information, the ego-vehicle travelling data and the environmental data may be processed as a multi-channel raster image data, wherein, each channel represents an environmental modality. The size of the raster image data is not limited to the present disclosure embodiments, and the following embodiments are described with the size of the raster image data being 224*224*6 as an example.

For example, it is taken as an example that the map data is a map with the length of 112 m in front, back, left, right of and centered around the ego vehicle, and according to the map data, the current position of the ego vehicle, the driving speed of the ego vehicle, the navigation data of the ego vehicle, and the historical position information of the target object, the raster image data with the size of 224*224*6 may be generated, and each pixel of the raster image data represents 0.5 m on the actual map. Meanwhile, in the six-channel raster image data, the data of the first channel represents an ego-vehicle position and an ego-vehicle size; the data of the second channel represents map information at the current time, including physical layout features (e.g., drivable areas on the map, intersections, locations of sidewalks, etc.) on the map; the data of the third channel represents historical position information of target objects such as other vehicles, pedestrians, cyclists, and the like; and the data of the fourth channel represents location information of all lane lines in a specific range; the data of the fifth channel represents ego-vehicle navigation route information; and the data of the sixth channel represents ego-vehicle speed information at the current time. The six-channel raster image data may offer a more comprehensive spatial-temporal environment in which the vehicle is located, so that the vehicle trajectory may be more accurately predicted when predicting the trajectory of the vehicle.

Step 102, processing the raster image data based on a neural network prediction model to obtain a multidimensional feature map.

In some embodiments, the neural network prediction model is configured to predict an initial trajectory vector (also referred to as an initial trajectory of an ego vehicle), an ego-vehicle multimodal heatmap, and an occupancy grid map corresponding to the target object.

Exemplarily, the multidimensional feature map includes a feature map in multiple dimensions, e.g., the multidimensional feature map includes an ego-vehicle multimodal heatmap, an occupancy grid map corresponding to the target object, and the initial trajectory vector. The ego-vehicle multimodal heatmap may also be referred to as an ego-vehicle bird-eye-view heatmap, wherein each pixel in the ego-vehicle multimodal heatmap represents a location on the ground, and a value of each pixel indicates a probability or confidence of presence of an ego-vehicle trajectory point at the location. Each pixel in the occupancy grid map corresponding to the target object represents a location on the ground, and a value of each pixel indicates a probability that other vehicles, pedestrians, or cyclists may be present at the location. The initial trajectory vector includes a plurality of trajectory points, each of which represents the position and angle of the vehicle at a future time. In other words, the neural network prediction model is able to predict the probability of the ego-vehicle future present at each location on the map, the initial trajectory of the ego vehicle, and a future occupancy position of other vehicles, pedestrians, or cyclists.

It would be understand that the neural network prediction model is able to more accurately understand and predict the initial trajectory of the ego vehicle, the probability of the ego vehicle present at a future time, and the probability of the target object present at a future time while processing the raster image data, since the raster image data may offer a more comprehensive spatial-temporal environment in which the ego vehicle is located.

Step 103, predicting a trajectory of the vehicle in a future predetermined time period based on the multidimensional feature map, and ego-vehicle size data and the environmental data of the vehicle.

In some embodiments, since the multidimensional feature map is for representing the probability of the ego vehicle future presented at various locations on the map, the initial trajectory of the ego vehicle, and the future occupancy positions of other vehicles, pedestrians, or cyclists, when the initial trajectory of the ego vehicle is further optimized in consideration with the multidimensional feature map, the vehicle size data, and the environmental data, an optimal trajectory, that takes into account not only the multimodality and uncertainty of the environment but also a kinematic model, the driving safety, and the comfort of the vehicle, may be obtained.

Exemplarily, the predicting of the trajectory of the vehicle may predict the optimal trajectory of the vehicle in a future predetermined time period, and a time length of the future predetermined time period may be a predetermined time length. For example, taking a predetermined time length of 8 s as an example, the neural network processor may predict the optimal trajectory of the vehicle in the next 8 seconds (referred to as s hereinafter) from a current time point. The embodiments of the present disclosure do not limit the time length of the future predetermined time period, and 8 s is used herein as an example for exemplary illustration, and in practical application, the time length of the future predetermined time period may also be other values.

In the method for predicting vehicle trajectory according to embodiments of the present disclosure, since the multi-channel raster image data may offer a more comprehensive spatial-temporal environment in which the vehicle is located, a multidimensional feature map that takes into account the multimodality and uncertainty of the environment may be obtained after the multi-channel raster image data is processed by a neural network prediction model. When the vehicle trajectory is predicted in consideration with the multidimensional feature map, vehicle size data and environmental data, the multimodality and uncertainty of the environment are fully taken into account, so that the predicted trajectory is able to ensure the safety of autonomous driving in complex and diverse driving scenarios.

Figure 2:
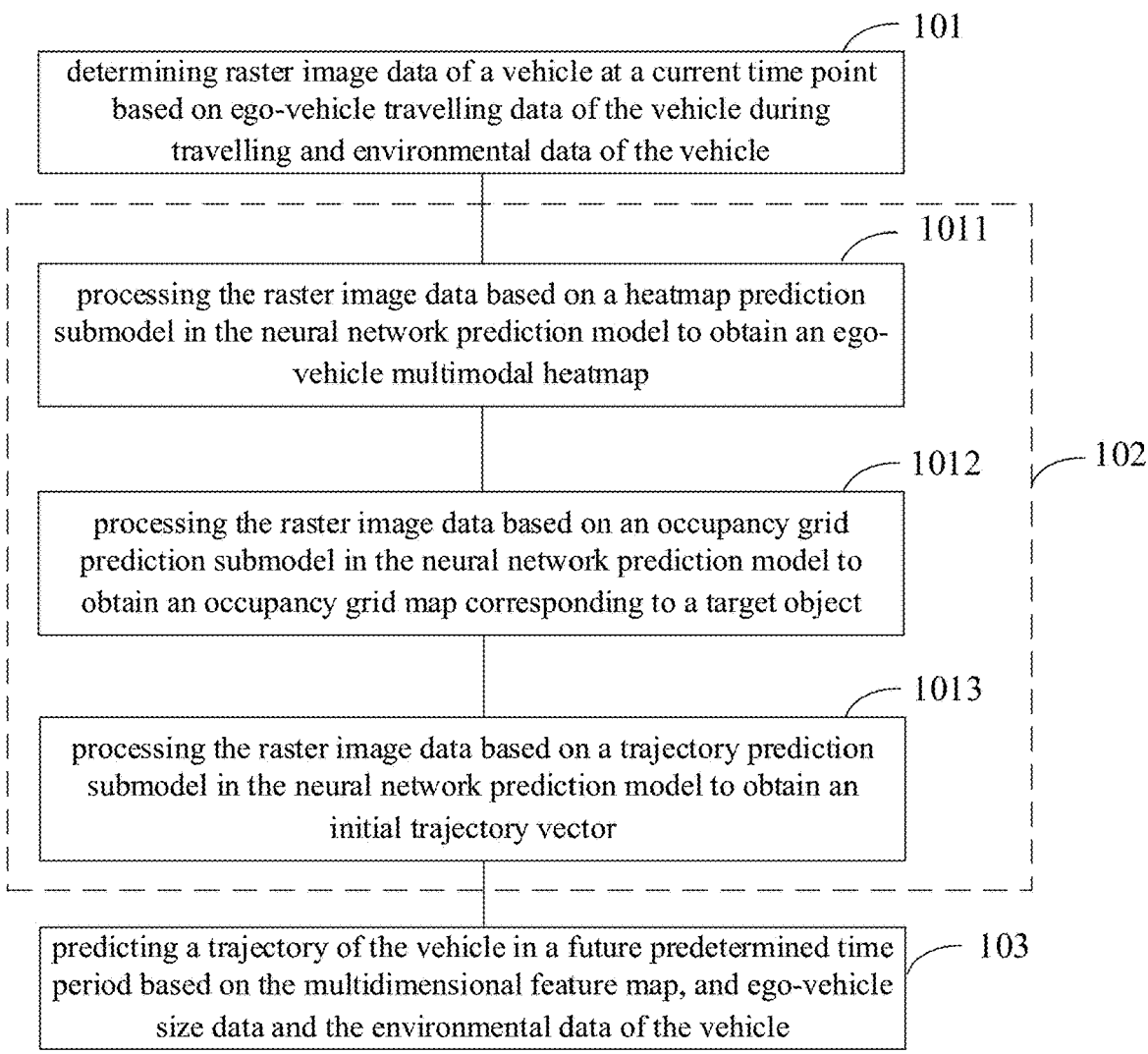
FIG. 2 is a flowchart illustrating a method for predicting vehicle trajectory according to another exemplary embodiment of the present disclosure.

As shown in FIG. 2, based on the embodiment shown in FIG. 1 above, Step 102 may include the following steps:

Step 1011, processing the raster image data based on a heatmap prediction submodel in the neural network prediction model to obtain an ego-vehicle multimodal heatmap.

Exemplarily, the heatmap prediction submodel is configured to predict an ego-vehicle multimodal heatmap, where each pixel on the ego-vehicle multimodal heatmap represents a location on the ground, and a value of each pixel indicates a probability or confidence that an ego-vehicle trajectory point may be presented at that location.

In some embodiments, the heatmap prediction submodel includes an encoder layer, a fusion layer, and a heatmap prediction layer. The encoder layer is configured to perform encoding processing on the multi-channel raster image data to obtain the encoded feature data. The fusion layer is configured to fuse the encoded feature data output from the encoder layer to integrate multi-resolution features. The heatmap prediction layer is configured to process the fused feature data output from the fusion layer to predict an ego-vehicle multimodal heatmaps of the ego vehicle at future times.

Exemplarily, the encoder layer in the heatmap prediction submodel may encode the multi-channel raster image data through a Resnet network to compress the image data. The fusion layer in the heatmap prediction submodel may integrate the multi-resolution features output from the encoder layer through a U-net network. The heatmap prediction layer in the heatmap prediction submodel may process the fused feature data output from the fusion layer through a convolutional neural network to obtain the ego-vehicle multimodal heatmap. The embodiments of the present disclosure do not limit the specific model structure of the heatmap prediction submodel, and the following embodiments are described exemplarily by using a Resnet network for the encoder layer, a U-net network for the fusion layer, and a convolutional layer for the heatmap prediction layer.

In some embodiments, it being taken as an example that the neural network processor may predict the optimal trajectory of a vehicle in the next 8 s from the current time point, the data size of the ego vehicle multimodal heatmap output from the heatmap prediction submodel may be 448*448*16, wherein each pixel in the ego-vehicle multimodal heatmap represents 0.25 m on the actual map, a prediction time interval between the two neighboring channels in data of the 16 channels is 0.5 s, and the data of the 16 channels are configured to represent the probability of presence of the ego vehicle trajectory point at each location on the map every 0.5 s (i.e., in the next 8 s) from the current time point, respectively.

Step 1012, processing the raster image data based on an occupancy grid prediction submodel in the neural network prediction model to obtain an occupancy grid map corresponding to a target object.

Exemplarily, the occupancy raster prediction submodel is configured to predict the occupancy grid map corresponding to the target object, which includes dynamic objects around the ego vehicle, such as other vehicles, pedestrians, cyclists, and other objects around the ego vehicle. Each pixel on this occupancy grid map represents a location on the ground, and the value of each pixel indicates a probability that the target object may be present at that location. For example, a pixel having a value of 1 indicates that the probability of the presence of the target object at that location is 100%, and a pixel having a value of 0 indicates that the probability of the presence of the target object at that location is 0.

In some embodiments, the occupancy grid prediction submodel includes an encoder layer, a fusion layer, and an occupancy grid prediction layer. The encoder layer is configured to perform encoding processing on the multi-channel raster image data to obtain the encoded feature data. The fusion layer is configured to fuse the encoded feature data output from the encoder layer to integrate the multi-resolution features. An occupancy grid prediction layer is configured to process the fused feature data output from the fusion layer to determine an occupancy grid map corresponding to the target object in the vicinity of the ego vehicle. Embodiments of the present disclosure do not limit the specific model structure of the occupancy grid prediction submodel.

Exemplarily, the encoder layer in the occupancy grid prediction submodel may encode the multi-channel raster image data through a Resnet network to compress the image data. The fusion layer in the occupancy grid prediction submodel may integrate multi-resolution features output from the encoder layer through a U-net network. The occupancy grid prediction layer in the occupancy grid prediction submodel may process the fused feature data output from the fusion layer through a convolutional neural network to obtain the occupancy grid map corresponding to the target object. The present disclosure embodiments do not limit the specific model structure of the occupancy raster prediction submodel.

In some embodiments, it being taken as an example that the neural network processor may predict the optimal trajectory of a vehicle in the next 8 s from the current time point, the data size of the occupancy grid map corresponding to the target object output from the occupancy grid prediction submodel may be 224*224*6, or 224*224*16. When the data size of the occupancy grid map corresponding to the target object is 224*224*6, a prediction time interval between two neighboring channels in the data of the 6 channels is 0.5 s, and the data of the 6 channels are configured to indicate the probability of the target object present at each location on the map every 0.5 s (i.e., within the next 3 s) from the current time point, respectively. When the data size of the occupancy grid map corresponding to the target object is 224*224*16, the prediction time interval of the two neighboring channels in the data of the 16 channels is 0.5 s, and the data of the 16 channels are configured to represent the probability of presence of the target object at each location on the map every 0.5 s (i.e., within the next 8 s) from the current time point, respectively. In order to save computational resources and improve the speed of trajectory prediction, when predicting the optimal trajectory of the vehicle in the next 8 s from the current time point in practical applications, the occupancy grid prediction submodel may predict the probability of the presence of the target object at each location on the map in the next 3 s.

Step 1013, processing the raster image data based on a trajectory prediction submodel in the neural network prediction model to obtain an initial trajectory vector.

Exemplarily, the trajectory prediction submodel is configured to predict an ego-vehicle initial trajectory vector. The ego-vehicle initial trajectory vector includes a plurality of trajectory points of the ego vehicle in a future predetermined time period. In order to ensure driving safety and comfort for the vehicle in a complex scene, after the initial trajectory vector is predicted by the neural network prediction model, it is necessary to optimize the initial trajectory vector in consideration with the ego-vehicle multimodal heatmap, the occupancy grid map corresponding to the target object, vehicle size data, and the environmental data, so as to ensure that the predicted optimal trajectory is able to ensure the safety of the autonomous driving in a complex scene.

In some embodiments, the trajectory prediction submodel includes an encoder layer, a data processing layer, and a trajectory prediction layer. The encoder layer is configured to perform encoding processing on the multi-channel raster image data to obtain the encoded feature data. The data processing layer is configured to flatten dimensions of the encoded feature data output from the encoder layer (e.g., merge an H dimension and a W dimension of the feature data output from the encoder layer) to obtain merged feature data. The trajectory prediction layer is configured to process the merged feature data output from the data processing layer to obtain a plurality of trajectory points (e.g., initial trajectory vectors) of the ego vehicle in a future predetermined time period. Embodiments of the present disclosure do not limit the specific model structure of the trajectory prediction submodel.

Exemplarily, the encoder layer in the trajectory prediction submodel may encode the multi-channel raster image data through a Resnet network to compress the image data. The data processing layer in the trajectory prediction submodel may merge the H dimension and the W dimension of the feature data output from the encoder layer through Flatten. The trajectory prediction layer in the trajectory prediction submodel may process the merged data through a fully-connected neural network (Multi-Layer Perception (MLP)) to obtain a plurality of trajectory points of the ego vehicle in the next 8 s. The present disclosure embodiments do not limit the specific model structure of the trajectory prediction submodel.

In some embodiments, it being taken as an example that the neural network processor may predict an optimal trajectory of a vehicle in the next 8 s from a current time point, the data size of the initial trajectory vector output from the trajectory prediction submodel may be 16*3, wherein 16 denotes the 16 trajectory points in the next 8 s, and 3 denotes predicted two-dimensional coordinate position and an ego-vehicle heading angle corresponding to each trajectory point.

In some embodiments, the encoder layers in the above-described heatmap prediction submodel, the occupancy grid prediction submodel, and the trajectory prediction submodel may adopt the same encoder layer, which is used for encoding the raster image data; and the fusion layers in the above-described heatmap prediction submodel and occupancy grid prediction submodel may adopt the same fusion layer, which is used for fusing the encoded feature data output from the encoder layer. When the same encoder layer is adopted for the encoder layer in the heatmap prediction submodel, the occupancy grid prediction submodel and the trajectory prediction submodel, and the same fusion layer is adopted for the fusion layer in the heatmap prediction submodel and the occupancy grid prediction submodel, the model structure of the neural network prediction model of the above Step 1011-Step 1013 is the same as that of the neural network prediction model shown in FIG. 4.

The method for predicting vehicle trajectory provided in embodiments of the present disclosure is capable of obtaining an ego-vehicle multimodal heatmap, an occupancy grid map corresponding to the target object, and an initial trajectory vector by processing the multichannel raster image through the heatmap prediction submodel, the occupancy raster prediction submodel, and the trajectory prediction submodel in the neural network prediction model. Since the vehicle trajectory is predicted in consideration with the multimodal heatmap of the ego vehicle and the occupancy grid map corresponding to the target object and fully taking into account the multimodality and uncertainty of the complex environment, the predicted trajectory is able to ensure the safety of the autonomous driving in the complex and diverse driving scenarios.

Figure 3:
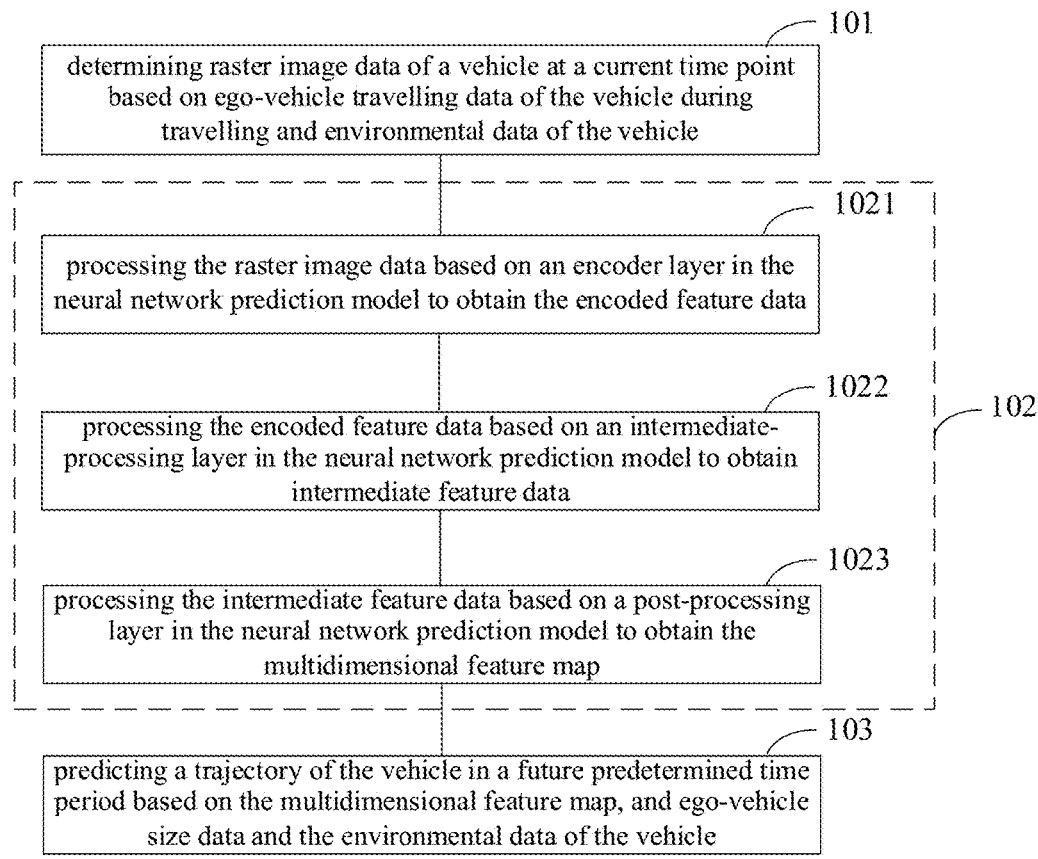
FIG. 3 is a flowchart illustrating a method for predicting vehicle trajectory according to yet another exemplary embodiment of the present disclosure.

As shown in FIG. 3, based on the embodiment shown in FIG. 2 above, Step 102 may include the following steps:

Step 1021, processing the raster image data based on an encoder layer in the neural network prediction model to obtain the encoded feature data.

Figure 4:
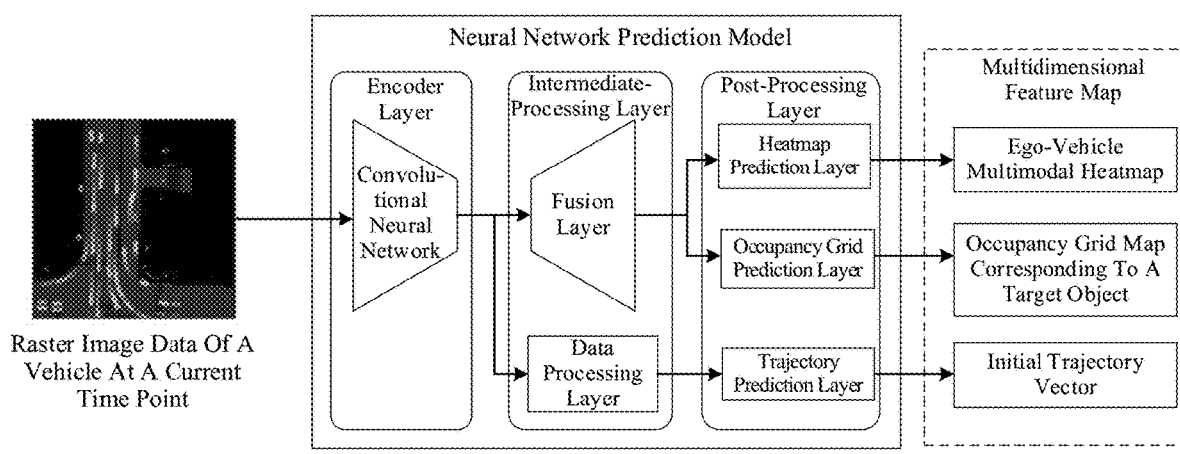
FIG. 4 is a schematic diagram illustrating a structure of a neural network prediction model according to an exemplary embodiment of the present disclosure.

As shown in FIG. 4, the neural network prediction model includes an encoder layer configured to process the multi-channel raster image data of the vehicle at the current time point in order to obtain the feature data at different scales.

In some embodiments, the encoder layer in the neural network prediction model may use a convolutional neural network, i.e., the encoder layer may process the multi-channel raster image data through the convolutional neural network to obtain feature data at different scales. For example, taking the convolutional neural network as a Resnet network as an example, the encoder layer in the neural network prediction model may encode the multi-channel raster image data by the Resnet network to obtain feature data at different scales. The present disclosure embodiments do not limit the specific structure of the encoder layer.

Step 1022, processing the encoded feature data based on an intermediate-processing layer in the neural network prediction model to obtain intermediate feature data.

As shown in FIG. 4, the neural network prediction model also includes the intermediate-processing layer configured to fuse multi-scale information, e.g., the intermediate-processing layer may fuse feature data of different scales output from the encoder layer.

In some embodiments, as shown in FIG. 4, the intermediate-processing layer in the neural network prediction model may include a fusion layer and a data processing layer, and the above-described intermediate feature data includes fused feature data and merged feature data. The above Step 1022 may include: processing the encoded feature data based on the fusion layer in the intermediate-processing layer to obtain the fused feature data; processing the dimensions of the encoded feature data based on the data processing layer in the intermediate-processing layer to obtain the merged feature data.

Exemplarily, as shown in FIG. 4, the fusion layer in the intermediate-processing layer may employ a multi-scale fusion layer of U-Net to integrate the multi-resolution features output from the encoder layer so that the model may capture both fine-grained and high-level contextual information. The data processing layer in the intermediate-processing layer may perform flattening processing (e.g., Flatten) on the feature data output from the encoder layer to output a one-dimensional array that is subsequently used to predict the initial vehicle trajectory. For example, the data processing layer may merge the H dimension and W dimension of the feature data output from the encoder layer to obtain the merged feature data.

Step 1023, processing the intermediate feature data based on a post-processing layer in the neural network prediction model to obtain the multidimensional feature map.

In some embodiments, as shown in FIG. 4, a post-processing layer in the neural network prediction model includes a heatmap prediction layer, an occupancy grid prediction layer, and a trajectory prediction layer, which are used for predicting different tasks respectively, and each of which has a corresponding supervised loss function during training. For example, the heatmap prediction layer, the occupancy grid prediction layer and the trajectory prediction layer are configured to output the multimodal heatmap of the ego vehicle, the occupancy grid map corresponding to the target object and the initial trajectory vector, respectively.

Exemplarily, the above Step 1023 may include: processing the fused feature data based on a heatmap prediction layer in the post-processing layer to obtain an ego-vehicle multimodal heatmap; processing the fused feature data based on an occupancy grid prediction layer in the post-processing layer to obtain an occupancy grid map corresponding to the target object; and processing the merged feature data based on a trajectory prediction layer in the post-processing layer to obtain an initial trajectory vector.

As shown in FIG. 4, the heatmap prediction layer may employ a convolutional neural network to process the fused feature data output from the fusion layer to predict the ego-vehicle multimodal heatmap of the ego vehicle at a future time. The occupancy grid prediction layer may use a convolutional neural network to process the fused feature data output from the fusion layer to predict the possible occupancy position of the target object at a future time. The trajectory prediction layer may employ a fully connected neural network MLP to process the merged feature data output from the data processing layer to predict the initial trajectory vector of the ego vehicle at a future time.

Embodiments of the present disclosure provide a method for predicting vehicle trajectory, wherein a plurality of network layers in a neural network prediction model may be used for prediction to obtain an ego-vehicle multimodal heatmap, an occupancy grid map corresponding to a target object, and an initial trajectory vector. Since the vehicle trajectory is predicted in consideration with the ego-vehicle multimodal heatmap and the occupancy grid map corresponding to the target object and fully taking into account the multimodality and uncertainty of the complex environment, the predicted trajectory is able to ensure the safety of the autonomous driving in the complex and diverse driving scenarios.

Figure 5:
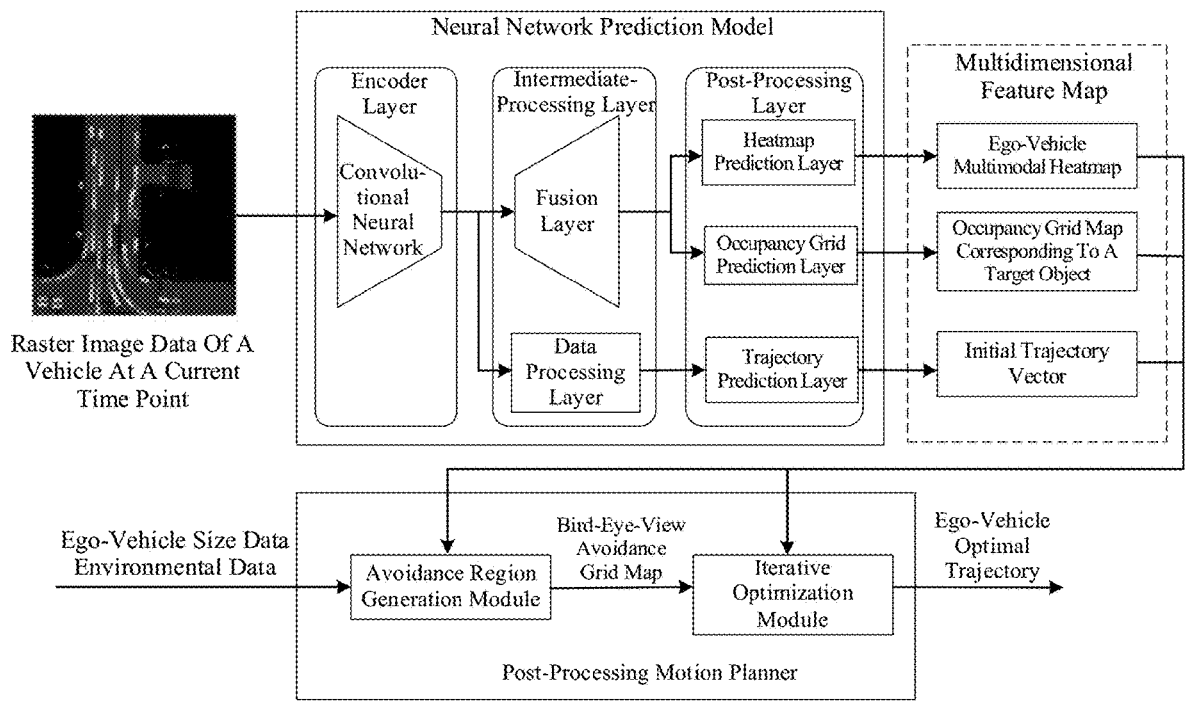
FIG. 5 is a schematic diagram illustrating a structure of a neural network prediction model connected to a post-processing motion planner according to an exemplary embodiment of the present disclosure.
Figure 6:
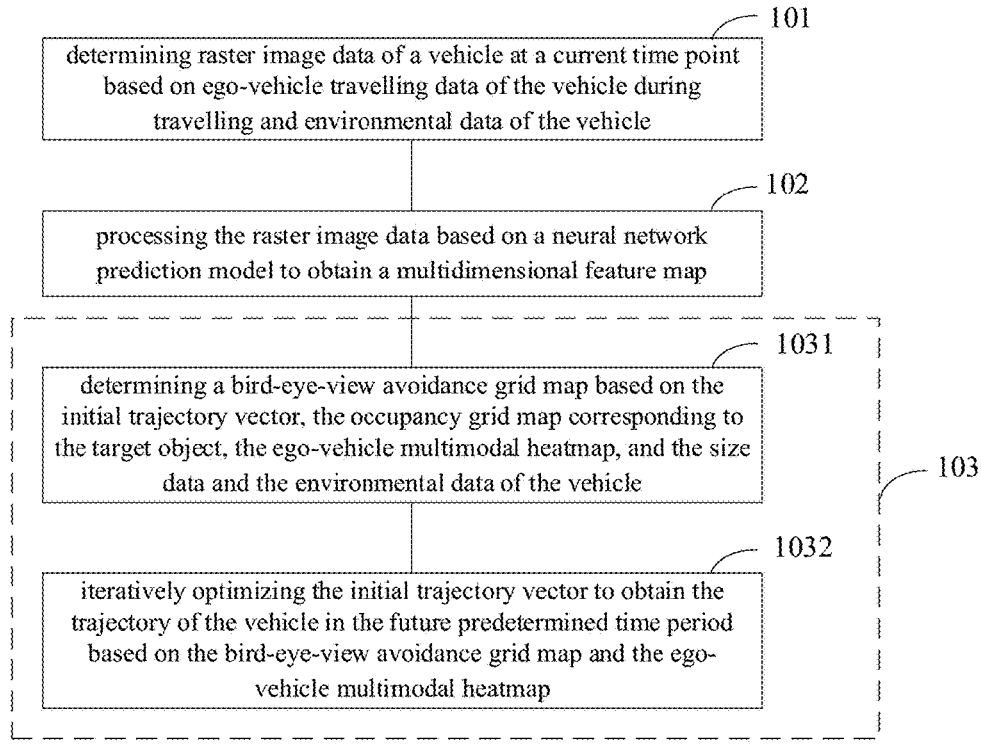
FIG. 6 is a flowchart illustrating a method for predicting vehicle trajectory according to yet another exemplary embodiment of the present disclosure.

In some embodiments, in order to ensure that the predicted trajectories may adapt to complex driving scenarios, as shown in FIG. 5, the ego-vehicle multimodal heatmap, the occupancy grid map corresponding to the target object, and the initial trajectory vectors output from the neural network prediction may be used as inputs to the post-processing motion planner, and The predicted initial trajectory vector by the neural network prediction model may be iteratively optimized to obtain a safe, reliable, and comfortable optimal trajectory for the ego-vehicle taking into account the kinematics model of the vehicle, the driver's comfort requirements, and the safety requirements. To this end, embodiments of the present disclosure also provide a method for predicting vehicle trajectory, wherein the Step 103 may include the following Step 1031-Step 1032, on the basis of the embodiment shown in FIG. 1-FIG. 3 above. With reference to FIG. 6, by way of example, a specific realization of the Step 103 is described as below, on the basis of the embodiment shown in FIG. 1.

Step 1031, determining a bird-eye-view avoidance grid map based on the initial trajectory vector, the occupancy grid map corresponding to the target object, the ego-vehicle multimodal heatmap, and the size data and the environmental data of the vehicle. The bird-eye-view avoidance grid map indicates a bird-eye-view grid map illustrating an avoidance region for collision or obstacle avoidance.

Exemplarily, as shown in FIG. 5, in order to ensure that the predicted trajectories may be adapted to complex driving scenarios, an avoidance region generation module in the post-processing motion planner may be utilized to fuse the ego-vehicle pose and sizes (e.g., ego-vehicle sizes, ego-vehicle initial trajectory vectors) with the dynamic and static information in the environment of the ego vehicle in order to obtain a bird-eye-view avoidance grid map, which includes safe areas and dangerous areas to be avoided while the vehicle is travelling.

Figure 7:
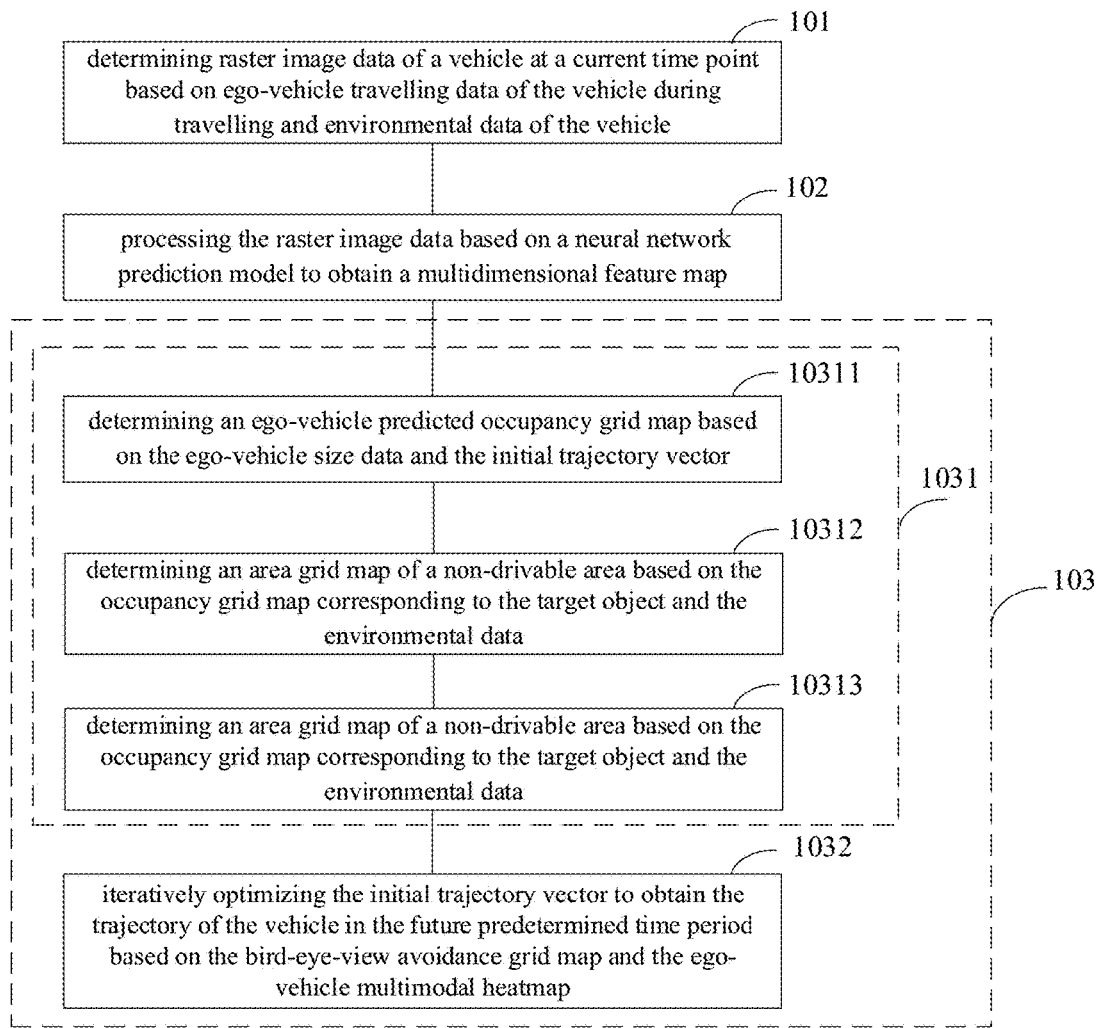
FIG. 7 is a flowchart illustrating a method for predicting vehicle trajectory according to yet another exemplary embodiment of the present disclosure.

The manner of determining the bird-eye-view avoidance grid map is exemplarily described below in conjunction with FIG. 7. As shown in FIG. 7, based on the embodiment shown in FIG. 6 above, Step 1031 may include the following steps:

Step 10311, determining an ego-vehicle predicted occupancy grid map based on the ego-vehicle size data and the initial trajectory vector.

Exemplarily, the ego-vehicle size data may include a length and a width of the ego vehicle. The initial trajectory vector includes a plurality of trajectory points of the ego vehicle in a future predetermined time period, so that an ego-vehicle pose (e.g., an ego-vehicle 2D coordinate position and an ego-vehicle heading angle, etc.) of the ego vehicle at a future time may be obtained based on the initial trajectory vector.

In some embodiments, an ego-vehicle predicted occupancy grid map may be obtained by rendering the ego-vehicle sizes and the ego-vehicle pose on a grid map, where each pixel in the ego-vehicle predicted occupancy grid map represents a location on the ground, and a value of each pixel indicates a probability of an ego-vehicle being present at that location.

Exemplarily, the size of the ego vehicle predicted occupancy grid map may be 19*19, and embodiments of the present disclosure do not limit the size of the size of the ego vehicle predicted occupancy grid map. It is taken as an example that the size of the ego vehicle predicted occupancy grid map is herein exemplarily described as 19*19.

Step 10312, determining an area grid map of a non-drivable area based on the occupancy grid map corresponding to the target object and the environmental data.

Exemplarily, in order to ensure that the ego-vehicle does not collide with a target objects (including other vehicles, pedestrians, cyclists), and static objects on the road (e.g., barricades, warning signs, ice cream cones, traffic cones, and other static information) when travelling in accordance with the predicted trajectory, it is necessary to first determine an area in which the ego-vehicle is not drivable.

In some embodiments, the environmental data in Step 10312 includes map data and static data in the environment in which the vehicle is located, e.g., data on static objects such as roadblocks, warning signs, ice cream cones, traffic cones, and the like.

Exemplarily, by rendering, on a map around the ego vehicle, the occupancy grid map corresponding to the target object and data of static objects in the environment in which the vehicle is located, the area grid map of the non-drivable area of the ego vehicle may be obtained.

Step 10313, performing a convolution of the area grid map and the ego-vehicle predicted occupancy grid map to obtain the bird-eye-view avoidance grid map.

Figure 8:
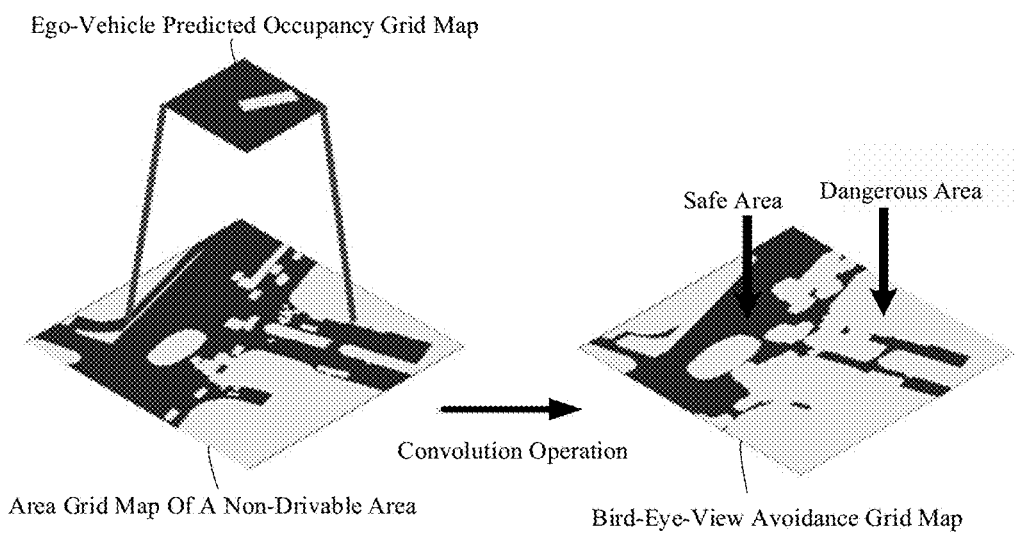
FIG. 8 is a schematic diagram illustrating generation of a bird-eye-view avoidance grid map according to an exemplary embodiment of the present disclosure.

Exemplarily, as shown in FIG. 8, when performing convolution processing on the area grid map and the ego-vehicle predicted occupancy grid map, the ego-vehicle predicted occupancy grid map may be used as a convolution kernel of the convolutional neural network, and the area grid map of the non-drivable area may be used as a convolved object, and by performing a convolution operation on both of them, the ego-vehicle convolution kernel and the information of the non-drivable area may be fused so as to obtain the bird-eye-view avoidance grid map (which may also be referred to as bird-eye-view grid map of collision avoidance region). The black area in the bird-eye-view avoidance grid map is the safe area and the gray area is the dangerous area, which is the area that needs to be avoided in order to avoid collision when the vehicle is travelling.

Exemplarily, the neural network processor in the vehicle has high support characteristics for convolutional neural networks, so Step 10313 may be performed very efficiently on the neural network processor in the vehicle.

Step 1032, iteratively optimizing the initial trajectory vector to obtain the trajectory of the vehicle in the future predetermined time period based on the bird-eye-view avoidance grid map and the ego-vehicle multimodal heatmap.

Exemplarily, after determining the bird-eye-view avoidance grid map, the initial trajectory vector may be iteratively optimized using an iterative optimization module in the post-processing motion planner, and the trajectory may be continuously adjusted during the iterative optimization by comprehensively considering constraints such as the bird-eye-view avoidance grid map, the ego-vehicle multimodal heatmap, and the vehicle kinematic model, so as to obtain the optimal trajectory in the safest and most comfortable and feasible manner.

Exemplarily, when iterative optimization of the initial trajectory is performed, an exemplary illustration is made with a cost function as the cost function shown in Equation (1) below.

$$f(\tau|\hat{\tau}, \hat{O}, \hat{H}) = \qquad \text{Equation (1)}$$
$$\lambda_{imi}\|\tau, \hat{\tau}\|_2 + \sum_{\phi \in \Phi}\phi(\tau) + \lambda_o \sum_t \mathcal{D}_o(\tau_t, \hat{O}^t) - \lambda_h \sum_t \mathcal{D}_h(\tau_t, \hat{H}^t),$$

where $f(\tau|\hat{\tau},\hat{O},\hat{H})$ denotes the cost function, t denotes time, $\tau$ denotes the initial trajectory, $\hat{\tau}$ denotes the optimal trajectory optimized iteratively, $\hat{O}$ denotes the bird-eye-view avoidance grid map, and $\hat{H}$ denotes the ego-vehicle multimodal heatmap, $\phi(\tau)$ denotes the ego-vehicle kinematics constraints, and $\lambda_{imi}$, $\lambda_o$ and $\lambda_h$ denote the predetermined parameters. $\mathcal{D}_o$ denotes a distance function based on the bird-eye-view avoidance grid map, and $\mathcal{D}_h$ denotes a distance function based on the ego-vehicle multimodal heatmap. $\phi$ having five terms, representing jerk, curvature, curvature rate, radial acceleration and lateral acceleration.

The $\mathcal{D}_o$ in Equation (1) is used for measuring the proximity of the collision location to the ego-vehicle trajectory in the distance space with Gaussian kernel, and the $\mathcal{D}_o$ may be obtained from Equation (2) below.

$$\mathcal{D}_o(\tau_t, \hat{O}^t) = \sum_{(x,y) \in S_o} \frac{\hat{O}^t(x, y)}{\sigma_o \sqrt{2\pi}} \exp\left(-\frac{\|\tau_t - (x, y)\|_2^2}{2\sigma_o^2}\right) \qquad \text{Equation (2)}$$

where (x, y) denotes an image plane position of the vehicle, $\tau_t$ denotes the trajectory at time t, and $\sigma_o$ denotes predetermined parameters.

The $\mathcal{D}_h$ in Equation (1) is used for measuring the proximity of the ego vehicle multimodal heatmap to the ego-vehicle trajectory in the distance space with a Gaussian kernel, and the $\mathcal{D}_h$ may be obtained from Equation (3) below.

$$\mathcal{D}_h(\tau_t, \hat{H}^t) = \sum_{(x,y) \in S_h} \frac{\hat{H}^t(x, y)}{\sigma_h \sqrt{2\pi}} \exp\left(-\frac{\|\tau_t - (x, y)\|_2^2}{2\sigma_h^2}\right) \qquad \text{Equation (3)}$$

where (x, y) denotes the image plane position of the vehicle, $\tau_t$ denotes the trajectory at time t, and $\sigma_h$ denotes predetermined parameters.

The first term $\lambda_{imi}\|\tau, \hat{\tau}\|_2$ in the above Equation (1) denotes imitating and learning of approximation degree of the trajectory, the second term $$\sum_{\phi \in \Phi}\phi(\tau)$$

denotes the comfort and kinematics constraints, the third term $$\lambda_o \sum_t \mathcal{D}_o(\tau_t, \hat{O}^t)\lambda_o \sum_t \mathcal{D}_o(\tau_t, \hat{O}^t)$$

denotes a degree of distance of the ego vehicle trajectory from the avoidance region, and the fourth term $$\lambda_h \sum_t \mathcal{D}_h(\tau_t, \hat{H}^t)\lambda_h \sum_t \mathcal{D}_h(\tau_t, \hat{H}^t)$$

denotes the degree of proximity of the ego vehicle trajectory to the ego-vehicle multimodal heatmap. Within the optimization space $\tau \in R^{T \times 3}$, the optimal trajectory $\hat{\tau}$ may be solved by gradient iteration. This optimal trajectory $\vec{\tau}$ is a trajectory that comprehensively takes into account the vehicle's kinematic model, the driver's comfort, and the most important safety constraints, and thus may ensure the safety of the autonomous driving in complex and diverse driving scenarios.

The method for predicting vehicle trajectory according to embodiments of the present disclosure, after obtaining an ego-vehicle multimodal heatmap, an occupancy grid map corresponding to the target object, and an initial trajectory vector, fuses the ego-vehicle pose and sizes with dynamic and static information in the environment of the ego vehicle by means of an avoidance region generation module in the post-processing motion planner, in order to obtain a dangerous area and a safe area that need to be avoided while the vehicle is travelling. Meanwhile, in consideration with the avoidance region, the initial trajectory vector is iteratively optimized using an iterative optimization module in the post-processing motion planner, which may obtain the optimal trajectory that comprehensively takes into account the vehicle's kinematics model, the driver's comfort, and most importantly the safety constraints, and thus ensure the safety of the autonomous driving in the complex and diverse driving scenarios.

Figure 9:
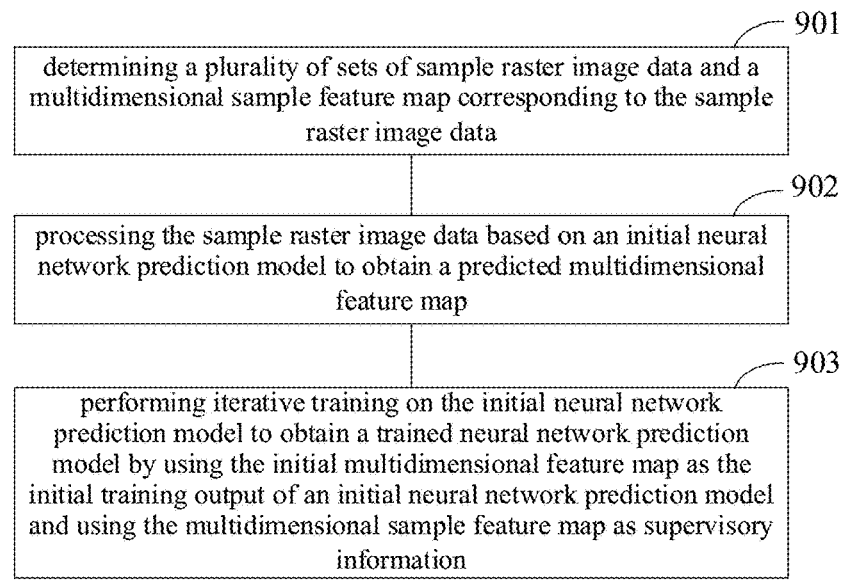
FIG. 9 is a flowchart illustrating a method for training a neural network prediction model according to an exemplary embodiment of the present disclosure.

In order to improve the prediction accuracy of the neural network prediction model, model training may be performed on the above-described neural network prediction model in advance to obtain the neural network prediction model used in the foregoing embodiments. Embodiments of the present disclosure also provide a method of training a neural network prediction model, as shown in FIG. 9, which includes the following Step 901-Step 903.

Step 901, determining a plurality of sets of sample raster image data and a multidimensional sample feature map corresponding to the sample raster image data.

Exemplarily, the sample raster image data may be sample raster image data determined based on the ego-vehicle travelling data and environmental data of the plurality of vehicles during historical travelling, and the manner of determining such sample raster image data may be referred to the manner of determining the raster image data in the foregoing Step 101, and will not be repeated herein.

In some embodiments, it is taken as an example that the neural network prediction model is configured to predict an initial trajectory vector, an ego-vehicle multimodal heatmap, and occupancy grid of the target object present possibly at a future time, and the aforementioned multidimensional sample feature map includes a sample trajectory vector, an ego-vehicle sample multimodal heatmap, and a sample occupancy grid map.

Exemplarily, in order to enhance generalization performance of the neural network prediction model, a random perturbation may be added to the sample raster image data during model training. For example, a random jittering may be applied to an ego-vehicle travelling position of a vehicle during historical travelling, e.g., experiencing a random deviation within the ranges of [0, 1.0] meters along the x-axis and [−1.0, 1.0] meters along the y-axis. Additionally, the heading of the ego vehicle was perturbed by an angle between [−0.25, 0.25] in radians. A new smooth trajectory is generated during the training process by fitting a trajectory starting at a randomly generated perturbed point and ended at the original end point of the true trajectory, and is used as the trajectory truth for training of the model. By adding the random perturbation during the model training process, it is possible to successfully deal with this deviation from the normal trajectory by the trained model when the ego-vehicle trajectory deviates from the normal trajectory, so as to enable the vehicle trajectory to return to the normal trajectory again.

After determining the plurality of sets of sample raster image data and a multidimensional sample feature map corresponding to the sample raster image data, each set of sample raster image data may be input into an initial neural network prediction model to obtain a predicted multidimensional feature map; then, based on the predicted multidimensional feature map, the initial neural network prediction model is iteratively trained using the multidimensional sample feature map corresponding to the sample raster image data as supervisory information to obtain the trained neural network prediction model. The trained neural network prediction model is capable of more accurately predicting the initial trajectory vector, the ego-vehicle multimodal heatmap, and the occupancy grid map corresponding to the target object. The training process of the neural network prediction model is described below through Step 902-Step 903.

Step 902, processing the sample raster image data based on an initial neural network prediction model to obtain a predicted multidimensional feature map.

The predicted multidimensional feature map includes a predicted ego-vehicle multimodal heatmap, a predicted occupancy grid map corresponding to a target object, and a predicted trajectory vector.

In some embodiments, the initial neural network prediction model includes an initial heatmap prediction submodel, an initial neural network prediction model, and an initial trajectory prediction submodel. The above Step 902 includes processing the sample raster image data based on the initial heatmap prediction submodel in the initial neural network prediction model to obtain the predicted ego-vehicle multimodal heatmap; processing the sample raster image data based on the initial occupancy grid prediction submodel in the initial neural network prediction model to obtain the predicted occupancy grid map; and processing the sample raster image data based on the initial trajectory prediction submodel in the initial neural network prediction model to obtain the predicted trajectory vector.

Exemplarily, after obtaining the predicted ego-vehicle multimodal heatmap, the predicted occupancy grid map, and the predicted trajectory vector, by using the predicted ego-vehicle multimodal heatmap, the predicted occupancy grid map, and the predicted trajectory vector as initial training outputs of the initial neural network prediction model and using the sample trajectory vector, the sample multimodal heatmap, and the sample occupancy grid map as supervisory information, iterative training may be performed on the initial neural network prediction model to obtain the trained neural network prediction model.

For example, a trajectory loss value may be determined based on the predicted trajectory vector and the sample trajectory vector; a heatmap loss value may be determined based on the predicted multimodal heatmap and the sample multimodal heatmap; an occupancy grid loss value may be determined based on the predicted occupancy grid map and the sample occupancy grid map; and the initial neural network prediction model may be iteratively updated based on the trajectory loss value, the heatmap loss value, and the occupancy grid loss value to obtain the trained neural network prediction model. That is, when the initial neural network prediction model includes an initial heatmap prediction submodel, an initial neural network prediction model, and an initial trajectory prediction submodel, each of the three submodels corresponds to a different supervisory loss function so as to iteratively update the initial neural network prediction model to obtain the trained neural network prediction model. The trained neural network prediction model may be the neural network prediction model in the aforementioned Step 1011-Step 1013.

Figure 10:
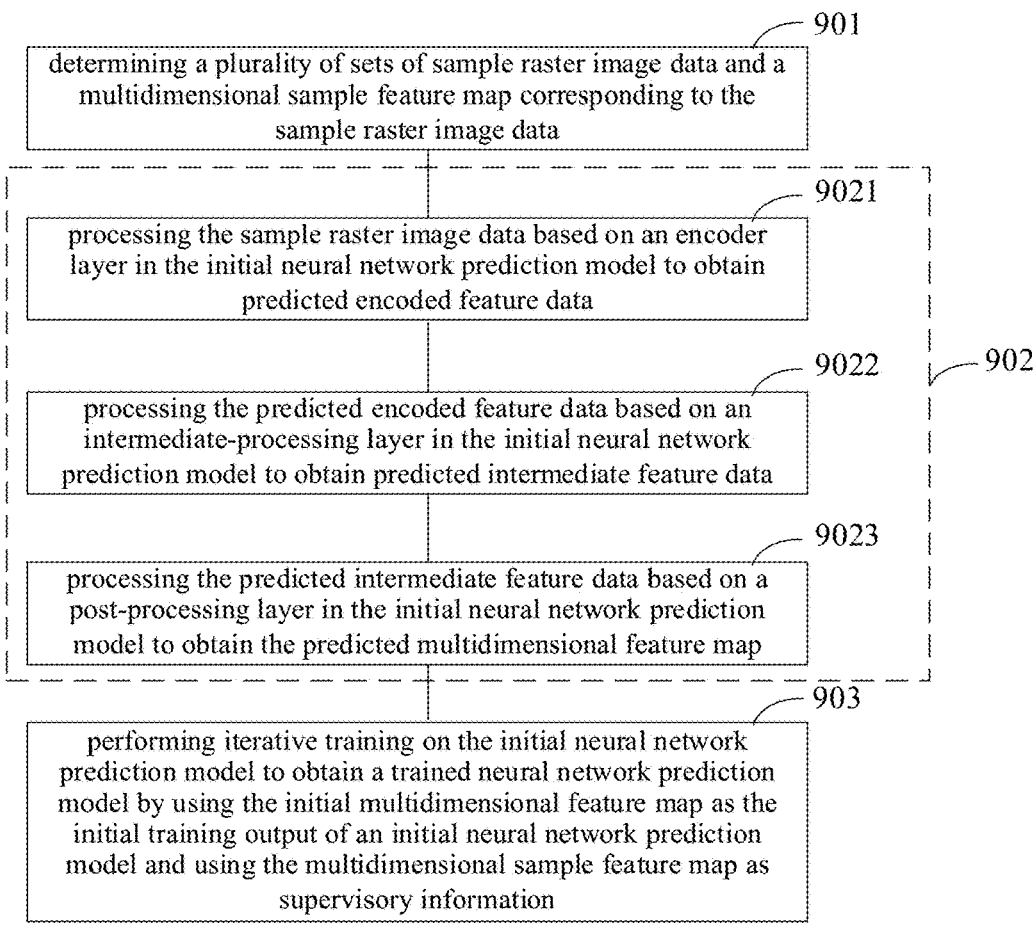
FIG. 10 is a flowchart illustrating a method for training a neural network prediction model according to another exemplary embodiment of the present disclosure.

In some embodiments, shown with reference to FIG. 10 in conjunction with FIG. 9, the above Step 902 may include Step 9021-Step 9023.

Step 9021, processing the sample raster image data based on an encoder layer in the initial neural network prediction model to obtain predicted encoded feature data.

Step 9022, processing the predicted encoded feature data based on an intermediate-processing layer in the initial neural network prediction model to obtain predicted intermediate feature data.

In some embodiments, the predicted intermediate feature data includes predicted fused feature data and predicted merged feature data. The above Step 9022 includes: processing the predicted encoded feature data based on a fusion layer in the intermediate-processing layer to obtain the predicted fused feature data; and processing dimensions of the predicted encoded feature data based on a data processing layer in the intermediate-processing layer to obtain the predicted merged feature data.

Step 9023, processing the predicted intermediate feature data based on a post-processing layer in the initial neural network prediction model to obtain the predicted multidimensional feature map.

In some embodiments, said Step 9023 includes: processing the predicted fused feature data based on the heatmap prediction layer in the post-processing layer to obtain the predicted ego-vehicle multimodal heatmap; processing the predicted fused feature data based on an occupancy grid prediction layer in the post-processing layer to obtain the predicted occupancy grid map; and processing the predicted merged feature data based on a trajectory prediction layer in the post-processing layer to obtain the predicted trajectory vector.

Exemplarily, the specific realization of the above Step 9021-Step 9023 may be referred to the aforementioned Step 1021-Step 1023, and will not be repeated herein.

Step 903, performing iterative training on the initial neural network prediction model to obtain a trained neural network prediction model by using the initial multidimensional feature map as the initial training output of an initial neural network prediction model and using the multidimensional sample feature map as supervisory information.

Figure 11:
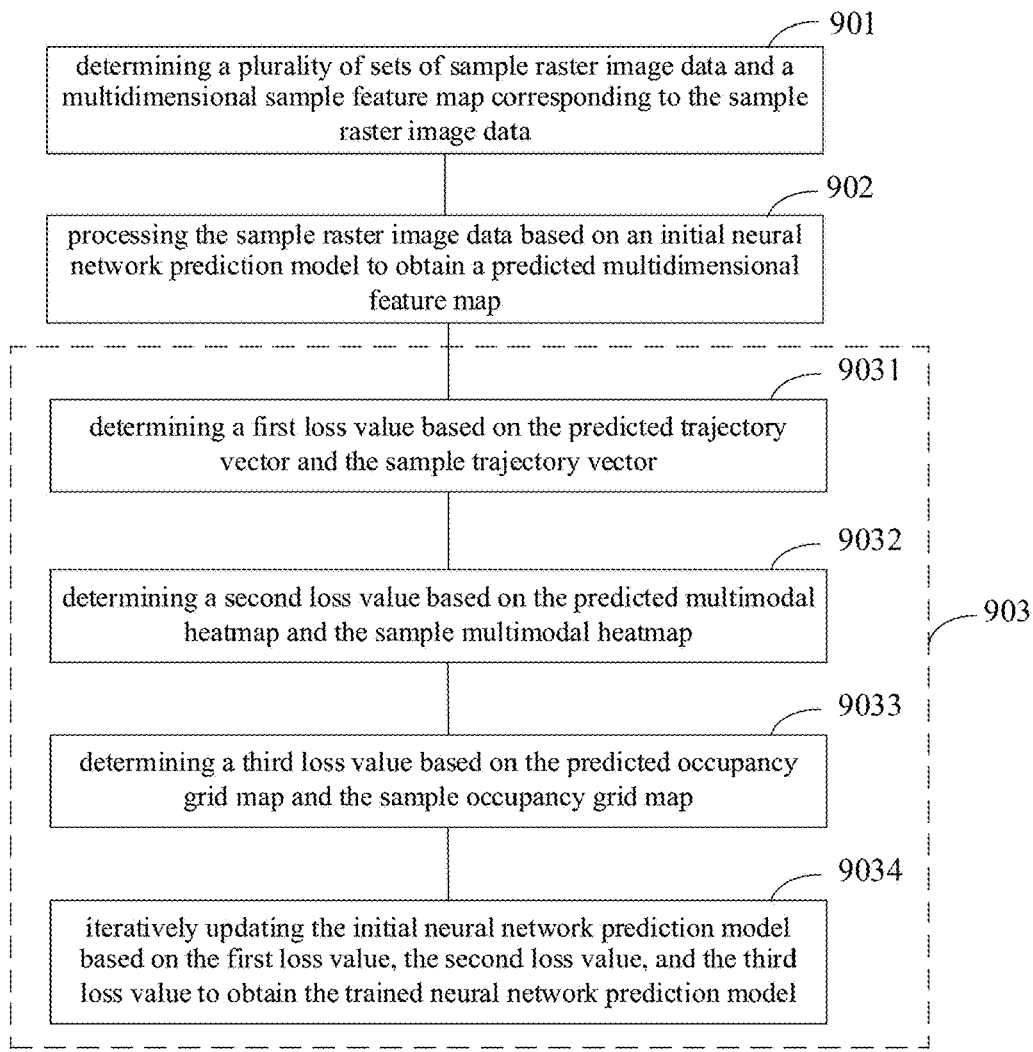
FIG. 11 is a flowchart illustrating a method for training a neural network prediction model according to yet another exemplary embodiment of the present disclosure.

In some embodiments, with reference to FIG. 11 in conjunction with FIG. 9, Step 903 may specifically include: Step 9031-Step 9034.

Step 9031, determining a first loss value based on the predicted trajectory vector and the sample trajectory vector.

For the prediction of the ego-vehicle trajectory, in order to make the predicted trajectory vector $\hat{\tau}$ as close as possible to the sample trajectory vector (which may also be referred to as a true value of the ego-vehicle trajectory) $\tilde{\tau}$, a loss function $L_{imi}$ with weight decay in terms of time may be employed. The loss function $L_{imi}$ for the ego vehicle trajectory prediction is shown in Equation (4).

$$L_{imi} = \sum_{t}^{T} \exp\left(\frac{t}{\alpha T}\right) \|\hat{\tau}_t, \tilde{\tau}_t\|_1 \qquad \text{Equation (4)}$$

where t denotes time, $\hat{T}_t$ is the predicted trajectory at time t, and $\tilde{T}_t$ is the sample trajectory at time t. Based on the predicted trajectory vector and the sample trajectory vector, the loss value for the ego-vehicle trajectory (which may also be referred to as the first loss value) may be determined by Equation (4).

Step 9032, determining a second loss value based on the predicted multimodal heatmap and the sample multimodal heatmap.

For the prediction of the ego-vehicle multimodal heatmap, a binary focal loss function $L_{hm}$ is applied. The loss function $L_{hm}$ for the ego-vehicle multimodal heatmap prediction is shown in Equation (5).

$$L_{hm} = \sum_{t} \mathcal{H}(\hat{H}_t, \tilde{H}_t) \qquad \text{Equation (5)}$$

where t denotes time, $\hat{H}_t$ denotes the predicted multimodal heatmap at the time t, and $\tilde{H}_t$ denotes the sample multimodal heatmap at the time t. Based on the predicted multimodal heatmap and the sample multimodal heatmap, the loss value of the ego-vehicle multimodal heatmap (which may also be referred to as the second loss value) may be determined by Equation (5).

Step 9033, determining a third loss value based on the predicted occupancy grid map and the sample occupancy grid map.

For the prediction of the occupancy grid map, the binary cross-entropy loss function Locc is employed. The loss function Locc for the occupancy grid prediction is shown in Equation (6).

$$L_{occ} = \sum_{t} \mathcal{B}(\hat{O}_t, \tilde{O}_t) \qquad \text{Equation (6)}$$

where t denotes time, $\hat{O}_t$ denotes the predicted occupancy grid at time t, and $\tilde{O}_t$ denotes the sample occupancy grid at time t (which may also be referred to as the true value of the occupancy grid at time t). Based on the predicted occupancy grid map and the sample occupancy grid map, the loss value for the occupancy grid (which may also be referred to as the third loss value) may be determined by Equation (6).

Step 9034, iteratively updating the initial neural network prediction model based on the first loss value, the second loss value, and the third loss value to obtain the trained neural network prediction model.

Exemplarily, a final loss function of the neural network prediction model is the weighted sum of the loss function $L_{imi}$ for the ego-vehicle trajectory prediction, the loss function $L_{hm}$ for the ego-vehicle multimodal heatmap prediction, and the loss function Locc for the occupancy grid prediction. The final loss function L of the neural network prediction model is shown in Equation (7).

$$L = \lambda_{imi} * L_{imi} + \lambda_{hm} * L_{hm} + \lambda_{occ} * L_{occ} \qquad \text{Equation (7)}$$

where L is the final loss function of the neural network prediction model, and $\lambda_{imi}$, $\lambda_{hm}$, $\lambda_{occ}$ denote the weights corresponding to the loss function $L_{imi}$ for the ego-vehicle trajectory prediction, the loss function $L_{hm}$ for the ego-vehicle multimodal heatmap prediction and the loss function Locc for the occupancy grid prediction, respectively.

Understandably, the loss value of ego-vehicle trajectory, the loss value of ego-vehicle multimodal heatmap and the loss value of occupancy grid may be obtained through the above Equation (4) to Equation (6), respectively, and then the final loss value of the neural network prediction model may be obtained in consideration with the Equation (7). Based on the final loss value, the neural network prediction model may be iteratively optimized until the final loss value meets predetermined conditions to the neural network prediction model which is capable of accurately realize the vehicle trajectory prediction, the ego-vehicle multimodal heatmap prediction and target object occupancy grid map prediction.

Through the neural network model prediction method according to embodiments of the present disclosure, by setting loss functions for the ego-vehicle trajectory, the ego-vehicle multimodal heatmap, and the occupancy grid, respectively, and obtaining a final loss function of the neural network prediction model in consideration with the three loss functions, the neural network prediction model is iteratively optimized by the final loss value, to ensure that the trained neural network prediction model is capable of accurately predicting the initial trajectory vectors of the vehicle, the ego-vehicle multimodal heatmap, and the target object occupancy grid map.

Exemplary Apparatus

Figure 12:
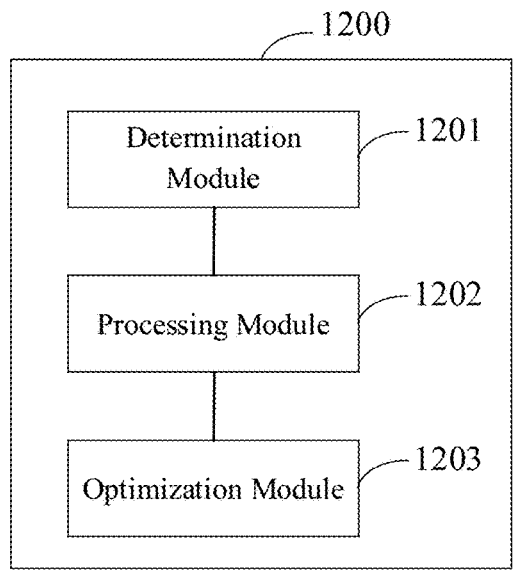
FIG. 12 is a block diagram illustrating a structure of an apparatus for predicting vehicle trajectory according to an exemplary embodiment of the present disclosure.

FIG. 12 shows an apparatus for predicting vehicle trajectory according to embodiments of the present disclosure. As shown in FIG. 12, the apparatus 1200 for predicting vehicle trajectory includes a determination module 1201, a processing module 1202, and an optimization module 1203.

The determination module 1201 is suitable for determining raster image data at a current time point of a vehicle based on ego-vehicle travelling data of the vehicle during travelling and environmental data of the vehicle.

The processing module 1202 is suitable for processing the raster image data determined by determination module 1201 based on a neural network prediction model to obtain a multidimensional feature map.

The optimization module 1203 is suitable for predicting a trajectory of the vehicle in a future predetermined time period based on the ego-vehicle size data, the environmental data, and the multidimensional feature map determined by the processing module 1203.

Figure 13:
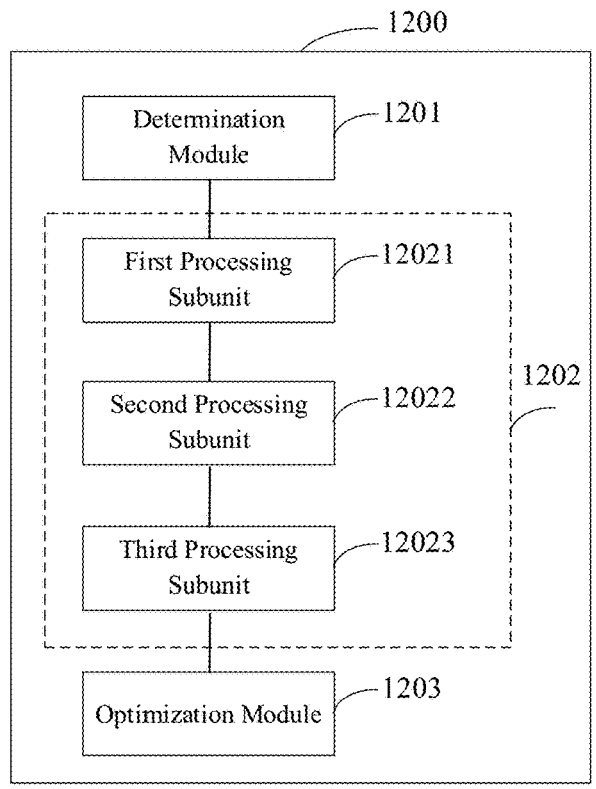
FIG. 13 is a block diagram illustrating a structure of an apparatus for predicting vehicle trajectory according to another exemplary embodiment of the present disclosure.

In some embodiments, as shown in FIG. 13, the processing module 1202 of FIG. 12 includes a first processing subunit 12021, a second processing subunit 12022, and a third processing subunit 12023. The aforementioned multidimensional feature maps include an ego-vehicle multimodal heatmap, an occupancy grid map corresponding to the target object, and an initial trajectory vector.

The first processing subunit 12021 is suitable for processing the raster image data determined by the determination module 1201 based on the heatmap prediction submodel in the neural network prediction model to obtain the ego-vehicle multimodal heatmap.

The second processing subunit 12022 is suitable for processing the raster image data determined by the determination module 1201 based on an occupancy grid prediction submodel in the neural network prediction model to obtain the occupancy grid map corresponding to the target object.

A third processing subunit 12023 is suitable for processing the raster image data determined by the determination module 1201 based on the trajectory prediction submodel in the neural network prediction model to obtain the initial trajectory vector.

Figure 14:
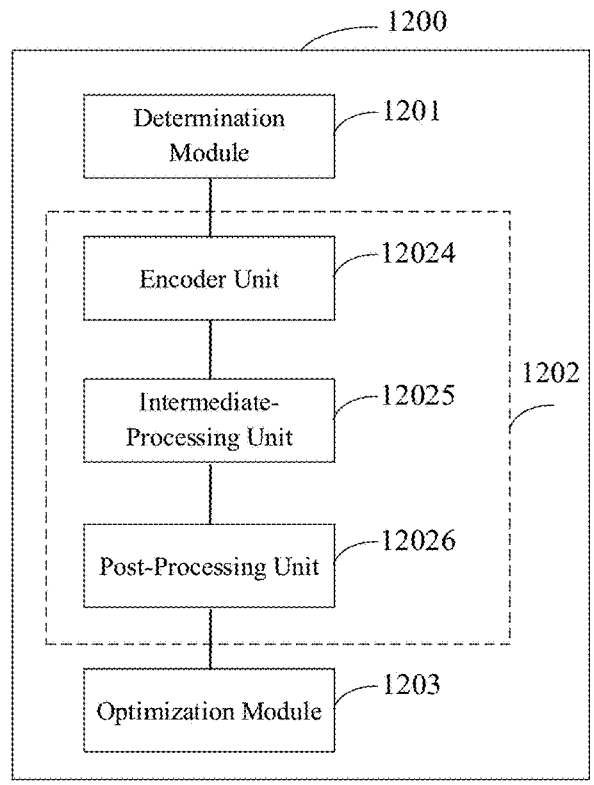
FIG. 14 is a block diagram illustrating a structure of an apparatus for predicting vehicle trajectory according to yet another exemplary embodiment of the present disclosure.

In some embodiments, as shown in FIG. 14, the processing module 1202 of FIG. 12 includes an encoder unit 12024, an intermediate-processing unit 12025, and a post-processing unit 12026.

The encoder unit 12024 is suitable for processing the raster image data determined by the determination module 1201 based on the encoder layer in the neural network prediction model to obtain the encoded feature data.

The intermediate-processing unit 12025 is suitable for processing the encoded feature data obtained through the encoder unit 12024 based on an intermediate-processing layer in the neural network prediction model to obtain intermediate feature data. The intermediate feature data includes fused feature data and merged feature data;

Exemplarily, the intermediate-processing unit 12025 is specifically suitable for processing the encoded feature data obtained through the encoder unit 12024 based on the fusion layer in the intermediate-processing layer to obtain the fused feature data; and for processing dimensions of the encoded feature data obtained through the encoder unit 12024 based on the data processing layer in the intermediate-processing layer to obtain the merged feature data.

The post-processing unit 12026 is suitable for processing the intermediate feature data obtained through the intermediate-processing unit 12025 based on the post-processing layer in the neural network prediction model to obtain the multidimensional feature map.

Exemplarily, the post-processing unit 12026 is specifically suitable for processing the merged feature data obtained through the intermediate-processing unit 12025 based on the heatmap prediction layer in the post-processing layer to obtain the ego-vehicle multimodal heatmap, processing the merged feature data obtained through the intermediate-processing unit 12025 based on the occupancy grid prediction layer in the post-processing layer to obtain the occupancy grid map corresponding to the target object, and processing the merged feature data obtained through the intermediate-processing unit 12025 based on the trajectory prediction layer in the post-processing layer processes to obtain the initial trajectory vector.

In some embodiments, the optimization module 1203 is specifically suitable for determining a bird-eye-view avoidance grid map based on an initial trajectory vector, an occupancy grid map corresponding to the target object, an ego-vehicle multimodal heatmap, ego-vehicle size data, and environmental data; and iteratively optimizing the initial trajectory vector based on the bird-eye-view avoidance grid map and the ego-vehicle multimodal heatmap to obtain the trajectory of the vehicle in a future predetermined time period.

Exemplarily, the optimization module 1203 is specifically suitable for determining an ego-vehicle predicted occupancy grid map based on the ego-vehicle size data and the initial trajectory vector, determining an area grid map of the non-drivable area based on the occupancy grid map corresponding to the target object and the environmental data, and performing a convolution process on the area grid map and the ego-vehicle predicted occupancy grid map to obtain the bird-eye-view avoidance grid map.

Beneficial technical effects corresponding to the exemplary embodiment of the apparatus 1200 for predicting vehicle trajectory may refer to the corresponding beneficial technical effects of the exemplary method described above, and will not be repeated herein.

Figure 15:
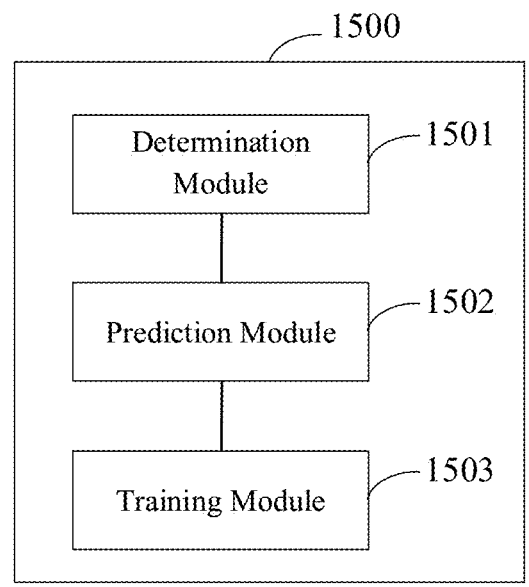
FIG. 15 is a block diagram illustrating a structure of an apparatus for training a neural network prediction model according to an exemplary embodiment of the present disclosure.

FIG. 15 shows an apparatus for training a neural network prediction model according to embodiments of the present disclosure. As shown in FIG. 15, the apparatus 1500 for training a neural network prediction model includes a determination module 1501, a prediction module 1502, and a training module 1503.

The determination module 1501 is suitable for determining a plurality of sets of sample raster image data and a multidimensional sample feature map corresponding to the sample raster image data, the multidimensional sample feature map including a sample trajectory prediction map, a sample multimodal heatmap, and a sample occupancy grid map.

The prediction module 1502 is suitable for processing the sample raster image data determined by the determination module 1501 based on an initial neural network prediction model to obtain a predicted multidimensional feature map, the predicted multidimensional feature map including a predicted ego-vehicle multimodal heatmap, a predicted occupancy grid map corresponding to a target object, and a predicted trajectory vector.

In some embodiments, the prediction module 1502 is specifically suitable for processing the sample raster image data based on an encoder layer in the initial neural network prediction model to obtain predicted encoded feature data, processing the predicted encoded feature data based on an intermediate-processing layer in the initial neural network prediction model to obtain predicted intermediate feature data, processing the predicted intermediate feature data based on a post-processing layer in the initial neural network prediction model to obtain predicted multidimensional feature maps.

In some embodiments, the predicted intermediate feature data includes predicted fused feature data and predicted merged feature data. The prediction module 1502 is specifically suitable for processing the predicted encoded feature data based on the fusion layer in the intermediate-processing layer to obtain the predicted fused feature data; and processing dimensions of the predicted encoded feature data based on the data processing layer in the intermediate-processing layer to obtain the predicted merged feature data.

In some embodiments, the prediction module 1502 is specifically suitable for processing the predicted fused feature data based on a heatmap prediction layer in the post-processing layer to obtain a predicted ego-vehicle multimodal heatmap, processing the predicted fused feature data based on an occupancy grid prediction layer in the post-processing layer to obtain a predicted occupancy grid map, processing the predicted merged feature data based on a trajectory prediction layer in the post-processing layer to obtain a predicted trajectory vector.

The training module 1503 is suitable for performing iterative training on the initial neural network prediction model to obtain a trained neural network prediction model by using the predicted multidimensional feature map determined by the prediction module 1502 as an initial training output of the initial neural network prediction model and using the multidimensional sample feature map as supervisory information.

In some embodiments, the training module 1503 is specifically suitable for determining a first loss value based on the predicted trajectory vectors and the sample trajectory vectors, determining a second loss value based on the predicted multimodal heatmaps and the sample multimodal heatmaps, determining a third loss value based on the predicted occupancy grid maps and the sample occupancy grid maps; and iteratively updating the initial neural network based on the first loss value, the second loss value, and the third loss value prediction model to obtain the trained neural network prediction model.

Beneficial technical effects corresponding to the exemplary embodiment of the apparatus 1500 for training a neural network prediction model may refer to the corresponding beneficial technical effects of the exemplary method section described above, and will not be repeated herein.

Exemplary Electronic Device

Figure 16:
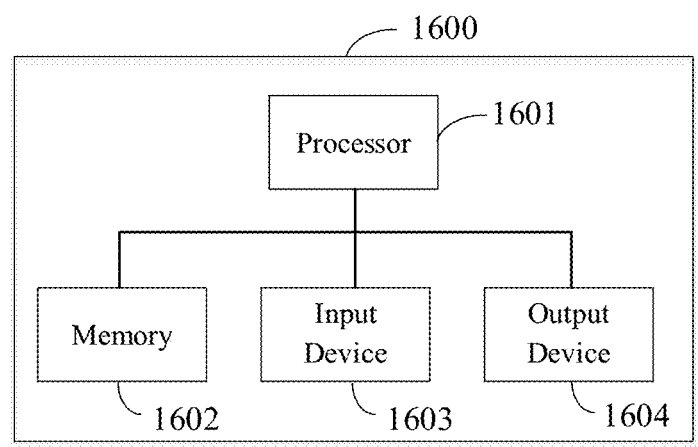
FIG. 16 is a block diagram illustrating a structure of an electronic device according to an exemplary embodiment of the present disclosure.

FIG. 16 is a block diagram illustrating a structure of an electronic device according to an embodiment of the present disclosure. As shown in FIG. 16, the electronic device 1600 includes one or more processors 1601 and a memory 1602.

The processor 1601 may be a central processing unit (CPU) or other form of processing unit having data processing capabilities and/or instruction execution capabilities, and may control other components in the electronic device 1600 to perform desired functions.

The memory 1602 may include one or more computer program products The computer program products may include various forms of computer readable storage media, such as a volatile memory and/or a non-volatile memory. The volatile memory may include, for example, a random access memory (RAM) and/or a cache memory (cache), among others. The non-volatile memory may include, for example a read-only memory (ROM), a hard disk, a flash memory, and the like. One or more computer program instructions may be stored on the computer-readable storage medium, and may be executed by the processor 1601 to implement the method for predicting vehicle trajectory, the method for training a neural network prediction model, and/or other desired functionality of the various embodiments of the present disclosure described above.

In one example, the electronic device 1600 may also include: an input device 1603 and an output device 1604, which are interconnected to each other through a bus system and/or other forms of connecting mechanisms (not shown).

The input device 1603 may also include, for example, a keyboard, a mouse, and the like.

The output device 1604 may output a variety of information to outside, and may include, for example, a display, a speaker, a printer, and a communication network and a remote output device connected thereto, among others.

Certainly, for the sake of simplicity, only some of the components in the electronic device 1600 related to the present disclosure are shown in FIG. 16, and components such as a bus, an input/output interface, and the like are omitted. In addition, the electronic device 1600 may include any other appropriate components, depending on the particular application.

Exemplary Computer Program Product and Computer-Readable Storage Medium

In addition to the foregoing methods and apparatus described above, the embodiments of the present disclosure may provide a computer program product, including computer program instructions that, when executed by a processor, cause the processor to implement the steps of the method for predicting vehicle trajectory or method for training a neural network prediction model according to various embodiments of the present disclosure described in the "Exemplary Methods" as above.

The computer program product may be program code, written with one or any combination of a plurality of programming languages, that is configured to perform the operations in the embodiments of the present disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, embodiments of the present disclosure may be a computer-readable storage medium on which computer program instructions are stored that, when executed by a processor, cause the processor to implement the steps of the method for predicting a vehicle trajectory or the method for training a neural network prediction model of various embodiments of the present disclosure, as described in the "Exemplary Methods" as above.

The computer-readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory) or a flash memory, an optical fiber, a portable compact disk read-only memory (CD-ROM), an optical storage device, a magnetic storage device, or any suitable combination of the above.

Basic principles of the present disclosure are described above in consideration with the specific embodiments. However, it should be pointed out that the advantages, superiorities, and effects mentioned in the present disclosure are merely illustrative but are not for limitation, and it cannot be considered that these advantages, superiorities, and effects are necessary for each embodiment of the present disclosure. In addition, specific details of the above disclosure are merely for examples and for ease of understanding, rather than limitations. The foregoing details do not limit that the present disclosure must be implemented by using the foregoing specific details.

Those skilled in the art may make various modifications and variations to the present disclosure without departing from the spirit and scope of the present application. Thus, if these modifications and variations of the present application fall within the scope of the present claims and their technical equivalents, the present disclosure is intended to encompass these modifications and variations as well.

What is claimed is:

1. A method for predicting vehicle trajectory, including:
   determining multi-channel raster image data of a vehicle at a current time point based on ego-vehicle travelling data of the vehicle during travelling and environmental data of the vehicle, wherein each channel of the multi-channel raster image data represents an environmental modality;
   processing the multi-channel raster image data based on a neural network prediction model to obtain a multidimensional feature map, wherein the multidimensional feature map includes an ego-vehicle multimodal heatmap, an occupancy grid map corresponding to a target object, and an initial trajectory vector; and
   predicting a trajectory of the vehicle in a future predetermined time period based on the multidimensional feature map, ego-vehicle size data and the environmental data,
   wherein the processing the multi-channel raster image data based on a neural network prediction model to obtain a multidimensional feature map includes:
   processing the multi-channel raster image data based on a heatmap prediction submodel in the neural network prediction model to obtain the ego-vehicle multimodal heatmap;
   processing the multi-channel raster image data based on an occupancy grid prediction submodel in the neural network prediction model to obtain the occupancy grid map corresponding to the target object; and
   processing the multi-channel raster image data based on a trajectory prediction submodel in the neural network prediction model to obtain the initial trajectory vector.

2. The method according to claim 1, wherein the processing the multi-channel raster image data based on a neural network prediction model to obtain a multidimensional feature map includes:
   processing the multi-channel raster image data based on an encoder layer in the neural network prediction model to obtain the encoded feature data;
   processing the encoded feature data based on an intermediate-processing layer in the neural network prediction model to obtain intermediate feature data; and
   processing the intermediate feature data based on a post-processing layer in the neural network prediction model to obtain the multidimensional feature map.

3. The method according to claim 2, wherein the processing the encoded feature data based on an intermediate-processing layer in the neural network prediction model to obtain intermediate feature data includes:
   processing the encoded feature data based on a fusion layer in the intermediate-processing layer to obtain fused feature data; and
   processing dimensions of the encoded feature data based on a data processing layer in the intermediate-processing layer to obtain merged feature data,
   wherein the intermediate feature data includes the fused feature data and the merged feature data.

4. The method according to claim 3, wherein the processing the intermediate feature data based on a post-processing layer in the neural network prediction model to obtain the multidimensional feature map includes:
   processing the fused feature data based on a heatmap prediction layer in the post-processing layer to obtain the ego-vehicle multimodal heatmap;
   processing the fused feature data based on an occupancy grid prediction layer in the post-processing layer to obtain the occupancy grid map corresponding to the target object; and
   processing the merged feature data based on a trajectory prediction layer in the post-processing layer to obtain the initial trajectory vector.

5. The method according to claim 1, wherein the predicting a trajectory of the vehicle in a future predetermined time period based on the multidimensional feature map, ego-vehicle size data and the environmental data includes:
   determining a bird-eye-view avoidance grid map based on the initial trajectory vector, the occupancy grid map corresponding to the target object, the ego-vehicle multimodal heatmap, the ego-vehicle size data, and the environmental data; and
   iteratively optimizing the initial trajectory vector to obtain the trajectory of the vehicle in the future predetermined time period based on the bird-eye-view avoidance grid map and the ego-vehicle multimodal heatmap.

6. The method according to claim 5, wherein the determining a bird-eye-view avoidance grid map based on the initial trajectory vector, the occupancy grid map corresponding to the target object, the ego-vehicle multimodal heatmap, the ego-vehicle size data, and the environmental data includes:
   determining an ego-vehicle predicted occupancy grid map based on the ego-vehicle size data and the initial trajectory vector;
   determining an area grid map of a non-drivable area based on the occupancy grid map corresponding to the target object and the environmental data; and performing a convolution of the area grid map and the ego-vehicle predicted occupancy grid map to obtain the bird-eye-view avoidance grid map.

7. A non-volatile computer-readable storage medium, storing a computer program which, when executed, implements a method for predicting vehicle trajectory, wherein the method includes:

determining multi-channel raster image data of a vehicle at a current time point based on ego-vehicle travelling data of the vehicle during travelling and environmental data of the vehicle, wherein each channel of the multi-channel raster image data represents an environmental modality;

processing the multi-channel raster image data based on a neural network prediction model to obtain a multidimensional feature map, wherein the multidimensional feature map includes an ego-vehicle multimodal heatmap, an occupancy grid map corresponding to a target object, and an initial trajectory vector; and predicting a trajectory of the vehicle in a future predetermined time period based on the multidimensional feature map, ego-vehicle size data and the environmental data, wherein the processing the multi-channel raster image data based on a neural network prediction model to obtain a multidimensional feature map includes:

processing the multi-channel raster image data based on a heatmap prediction submodel in the neural network prediction model to obtain the ego-vehicle multimodal heatmap;

processing the multi-channel raster image data based on an occupancy grid prediction submodel in the neural network prediction model to obtain the occupancy grid map corresponding to the target object; and processing the multi-channel raster image data based on a trajectory prediction submodel in the neural network prediction model to obtain the initial trajectory vector.

8. The computer-readable storage medium according to claim 7, wherein the processing the multi-channel raster image data based on a neural network prediction model to obtain a multidimensional feature map includes:

processing the multi-channel raster image data based on an encoder layer in the neural network prediction model to obtain the encoded feature data;

processing the encoded feature data based on an intermediate-processing layer in the neural network prediction model to obtain intermediate feature data; and processing the intermediate feature data based on a post-processing layer in the neural network prediction model to obtain the multidimensional feature map.

9. The computer-readable storage medium according to claim 8, wherein the processing of the encoded feature data based on an intermediate-processing layer in the neural network prediction model to obtain intermediate feature data includes:

processing the encoded feature data based on a fusion layer in the intermediate-processing layer to obtain fused feature data; and processing dimensions of the encoded feature data based on a data processing layer in the intermediate-processing layer to obtain merged feature data, wherein the intermediate feature data includes the fused feature data and the merged feature data.

10. The computer-readable storage medium according to claim 9, wherein the processing the intermediate feature data based on a post-processing layer in the neural network prediction model to obtain the multidimensional feature map includes:

processing the fused feature data based on a heatmap prediction layer in the post-processing layer to obtain the ego-vehicle multimodal heatmap;

processing the fused feature data based on an occupancy grid prediction layer in the post-processing layer to obtain the occupancy grid map corresponding to the target object; and processing the merged feature data based on a trajectory prediction layer in the post-processing layer to obtain the initial trajectory vector.

11. The computer-readable storage medium according to claim 7, wherein the predicting a trajectory of the vehicle in a future predetermined time period based on the multidimensional feature map, ego-vehicle size data and the environmental data includes:

determining a bird-eye-view avoidance grid map based on the initial trajectory vectors, the occupancy grid map corresponding to the target object, the ego-vehicle multimodal heatmap, the ego-vehicle size data, and the environmental data; and iteratively optimizing the initial trajectory vector to obtain the trajectory of the vehicle in the future predetermined time period based on the bird-eye-view avoidance grid map and the ego-vehicle multimodal heatmap.

12. The computer-readable storage medium according to claim 11, wherein the determining of a bird-eye-view avoidance grid map based on the initial trajectory vector, the occupancy grid map corresponding to the target object, the ego-vehicle multimodal heatmap, the ego-vehicle size data, and the environmental data, includes:

determining an ego-vehicle predicted occupancy grid map based on the ego-vehicle size data and the initial trajectory vector;

determining an area grid map of a non-drivable area based on the occupancy grid map corresponding to the target object and the environmental data; and performing a convolution of the area grid map and the ego-vehicle predicted occupancy grid map to obtain the bird-eye-view avoidance grid map.

13. An electronic device, including:

a processor; and a memory for storing processor-executable instructions, wherein the processor is configured to read the executable instructions from the memory and execute the instructions to implement a method for predicting vehicle trajectory, wherein the method includes:

determining multi-channel raster image data of a vehicle at a current time point based on ego-vehicle travelling data of the vehicle during travelling and environmental data of the vehicle, wherein each channel of the multi-channel raster image data represents an environmental modality;

processing the multi-channel raster image data based on a neural network prediction model to obtain a multidimensional feature map, wherein the multidimensional feature map includes an ego-vehicle multimodal heatmap, an occupancy grid map corresponding to a target object, and an initial trajectory vector; and predicting a trajectory of the vehicle in a future predetermined time period based on the multidimensional feature map, ego-vehicle size data and the environmental data, wherein the processing the multi-channel raster image data based on a neural network prediction model to obtain a multidimensional feature map includes:

processing the multi-channel raster image data based on a heatmap prediction submodel in the neural network prediction model to obtain the ego-vehicle multimodal heatmap;

processing the multi-channel raster image data based on an occupancy grid prediction submodel in the neural network prediction model to obtain the occupancy grid map corresponding to the target object; and processing the multi-channel raster image data based on a trajectory prediction submodel in the neural network prediction model to obtain the initial trajectory vector.

14. The electronic device according to claim 13, wherein the processing the multi-channel raster image data based on a neural network prediction model to obtain a multidimensional feature map includes:

processing the multi-channel raster image data based on an encoder layer in the neural network prediction model to obtain the encoded feature data;

processing the encoded feature data based on an intermediate-processing layer in the neural network prediction model to obtain intermediate feature data; and processing the intermediate feature data based on a post-processing layer in the neural network prediction model to obtain the multidimensional feature map.

15. The electronic device according to claim 14, wherein the processing the encoded feature data based on an intermediate-processing layer in the neural network prediction model to obtain intermediate feature data includes:

processing the encoded feature data based on a fusion layer in the intermediate-processing layer to obtain fused feature data; and processing dimensions of the encoded feature data based on a data processing layer in the intermediate-processing layer to obtain merged feature data, wherein the intermediate feature data includes the fused feature data and the merged feature data.

16. The electronic device according to claim 15, wherein the processing the intermediate feature data based on a post-processing layer in the neural network prediction model to obtain the multidimensional feature map includes:

processing the fused feature data based on a heatmap prediction layer in the post-processing layer to obtain the ego-vehicle multimodal heatmap;

processing the fused feature data based on an occupancy grid prediction layer in the post-processing layer to obtain the occupancy grid map corresponding to the target object; and processing the merged feature data based on a trajectory prediction layer in the post-processing layer to obtain the initial trajectory vector.

17. The electronic device according to claim 13, wherein the predicting a trajectory of the vehicle in a future predetermined time period based on the multidimensional feature map, ego-vehicle size data and the environmental data includes:

determining a bird-eye-view avoidance grid map based on the initial trajectory vector, the occupancy grid map corresponding to the target object, the ego-vehicle multimodal heatmap, the ego-vehicle size data, and the environmental data; and iteratively optimizing the initial trajectory vector to obtain the trajectory of the vehicle in the future predetermined time period based on the bird-eye-view avoidance grid map and the ego-vehicle multimodal heatmap.

* * * * *